US012781899B2

(12) United States Patent
Baker

(10) Patent No.: US 12,781,899 B2
(45) Date of Patent: Nov. 3, 2026

(54) SELF-CENTERING CLAMPING DEVICE

(71) Applicant: Raymond Baker, Wentzville, MO (US)

(72) Inventor: Raymond Baker, Wentzville, MO (US)

( * ) Notice: Subject to any disclaimer, the term of this patent is extended or adjusted under 35 U.S.C. 154(b) by 3 days.

(21) Appl. No.: 19/025,439

(22) Filed: Jan. 16, 2025

(65) Prior Publication Data

US 2026/0201996 A1 Jul. 16, 2026

(51) Int. Cl.
*F16L 37/20* (2006.01)
*F16L 23/00* (2006.01)
*F16L 23/06* (2006.01)
*F16L 37/18* (2006.01)

(52) U.S. Cl.
CPC ............ *F16L 37/20* (2013.01); *F16L 23/003* (2013.01); *F16L 23/006* (2013.01); *F16L 23/06* (2013.01); *F16L 37/18* (2013.01)

(58) Field of Classification Search
CPC . F16L 37/20; F16L 37/18; F16L 23/06; F16L 23/003; F16L 23/006
See application file for complete search history.

(56) References Cited

U.S. PATENT DOCUMENTS 2,370,354 A 2/1945 Hurst
3,278,205 A * 10/1966 Barlow .................. F16L 37/20
3,494,641 A 2/1970 Caregnato
3,642,307 A * 2/1972 Brickhouse
3,661,408 A * 5/1972 Gibbons ................ F16L 37/20
4,103,712 A * 8/1978 Fletcher ................. F16L 37/20
4,569,539 A * 2/1986 Creedon
4,575,130 A 3/1986 Pemberton
5,005,876 A 4/1991 Fahl
5,535,984 A * 7/1996 Anderson .............. F16L 37/20
5,911,445 A * 6/1999 Lee ......................... F16L 37/18
6,234,555 B1 5/2001 Emmerich
8,240,718 B2 * 8/2012 Morton .................. F16L 23/06
8,469,407 B2 6/2013 Tausch
D879,258 S 3/2020 Zimmerman
11,298,718 B1 * 4/2022 Wirt ....................... F16L 37/20
2003/0116968 A1 * 6/2003 Dallai ..................... F16L 37/20

FOREIGN PATENT DOCUMENTS

EP 1221568 12/2000

* cited by examiner

*Primary Examiner* — William S. Choi

(57) ABSTRACT

A self-centering clamping device includes a cylinder that can be mated to an output pipe of a food product processing machine. A pair of clamp mounts is coupled to the cylinder and a pair of clamping units is pivotally coupled to a respective clamp mount. Each clamping unit is urgeable into a clamping position to secure the output pipe of the food product processing machine to the cylinder such that a food product can flow through the cylinder. Each clamping unit of the pair of clamping units is urgeable into a releasing position to release the output pipe of the food product processing machine such that the cylinder can be removed from the output pipe of the food product processing machine.

16 Claims, 12 Drawing Sheets

SELF-CENTERING CLAMPING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to clamping devices and more particularly pertains to a new clamping device for clamping a cylinder to an output pipe of a food product processing machine in the event that food product is free flowing from the output pipe such that the free flowing food product can be safely routed through a conduit. The device includes a pair of clamp mounts which are attached to opposing sides of a cylinder. The cylinder includes a flange that is matable to the output pipe and the device includes a pair of clamping units which are each movably attached to a respective clamp mount. Each of the clamping units includes a lever that is pivotable to move the pair of clamping units into a clamping position to clamp the output pipe of the food product processing machine onto the flange of the cylinder.

(2) Description of Related Art Including Information Disclosed Under 37 CFR 1.97 and 1.98

The prior art relates to clamping devices including: a variety of detachable coupling devices which each at least includes a cylinder that is matable to a pipe and a plurality of clamping units each pivotally coupled to the cylinder which are each pivotable into a clamping position such that a finger of each clamping unit pulls downwardly on the pipe to secure the cylinder to the pipe; a variety of detachable coupling which each at least includes a cylinder which is matable to a pipe and a lever pivotally attached to the cylinder and a locking mechanism in mechanical communication with the lever for locking the cylinder to the pipe. In no instance does the prior art disclose a self-centering clamping device that includes a cylinder that is matable to an output pipe of a food product processing machine and a pair clamping units each pivotally attached on opposite sides of the cylinder which each includes a clamp that is curved to extend around the pipe when the clamping units are clamped to center the pipe in the cylinder.

BRIEF SUMMARY OF THE INVENTION

An embodiment of the disclosure meets the needs presented above by generally comprising a cylinder that can be mated to an output pipe of a food product processing machine. A pair of clamp mounts is coupled to the cylinder and a pair of clamping units is pivotally coupled to a respective clamp mount. Each clamping unit is urgeable into a clamping position to secure the output pipe of the food product processing machine to the cylinder such that a food product can flow through the cylinder. Each clamping unit of the pair of clamping units is urgeable into a releasing position to release the output pipe of the food product processing machine such that the cylinder can be removed from the output pipe of the food product processing machine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
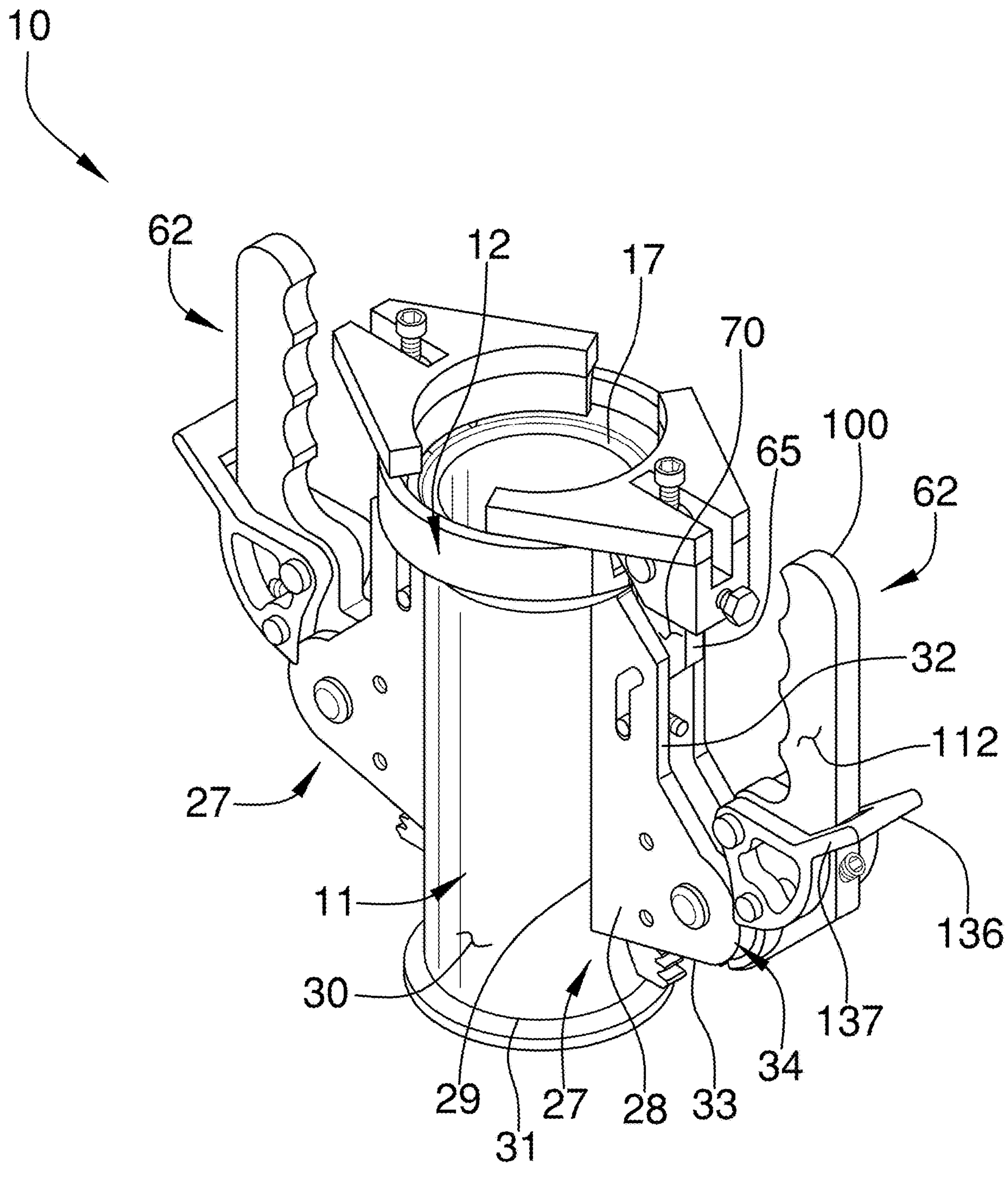
FIG. 1 is a top perspective view of a self-centering clamping device according to an embodiment of the disclosure showing a pair of clamping units in a clamping position.
Figure 2:
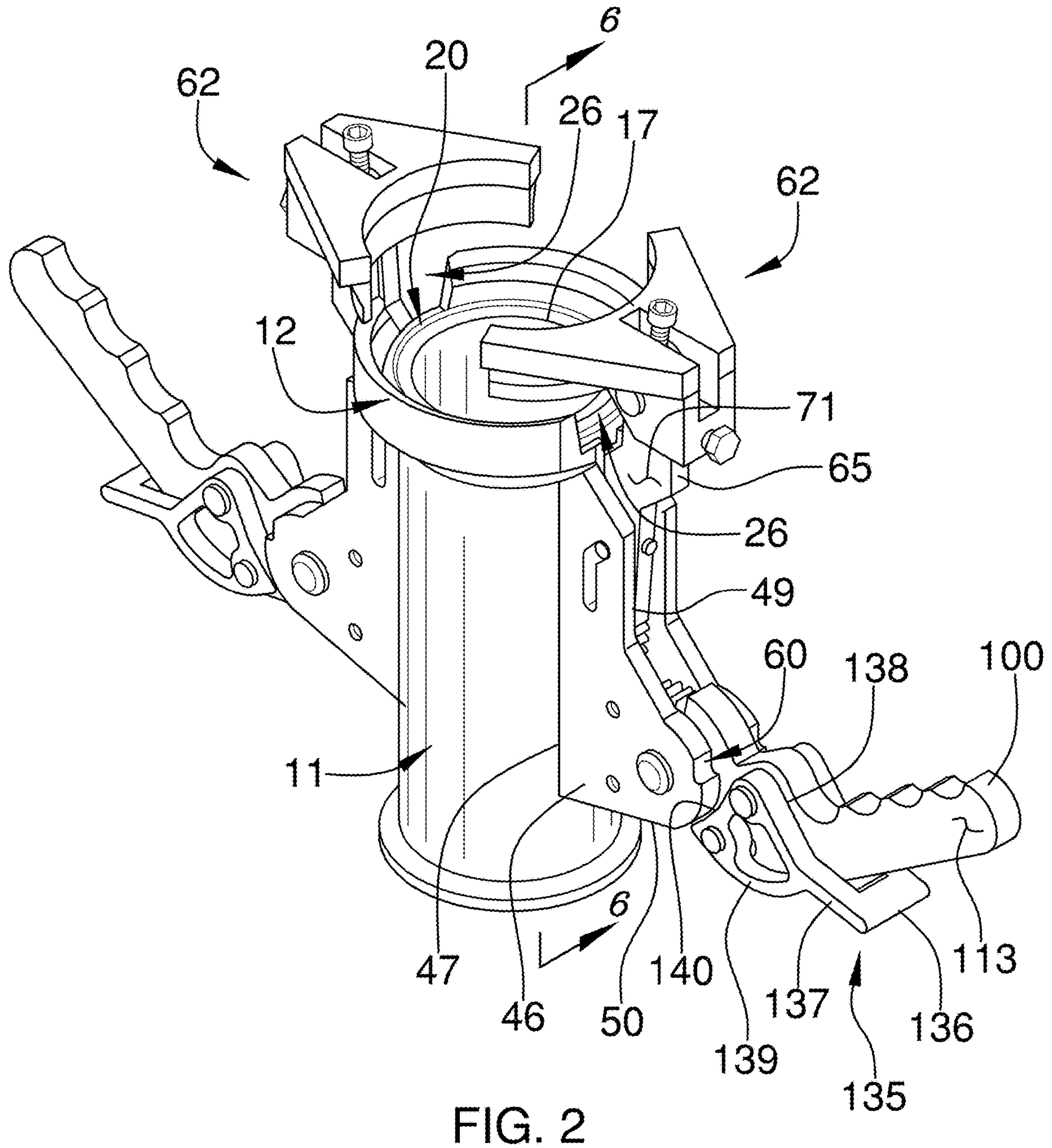
FIG. 2 is a top perspective view of an embodiment of the disclosure showing a pair of clamping units in a releasing position.
Figure 3:
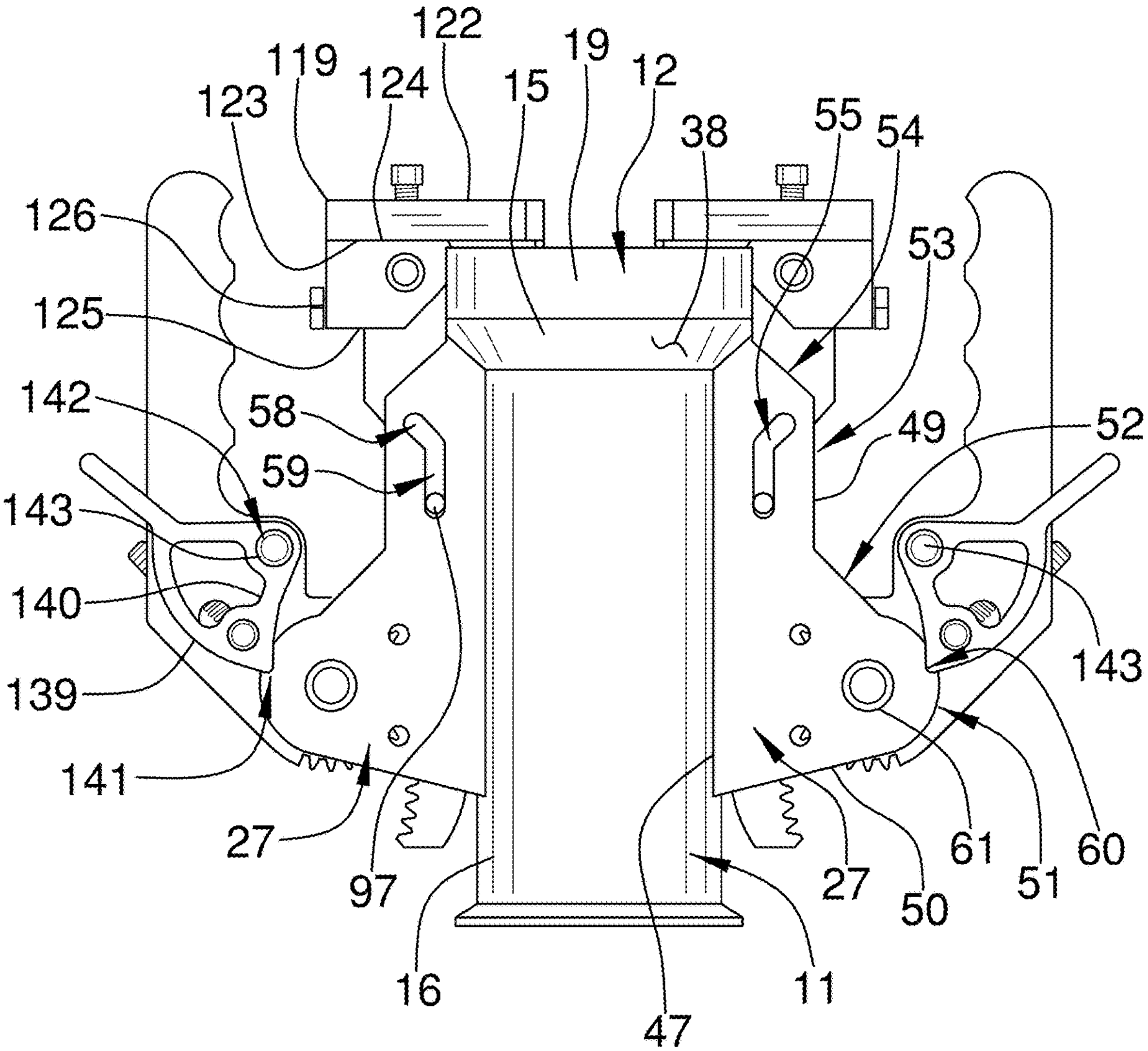
FIG. 3 is a front view of an embodiment of the disclosure showing a pair of clamping units in a clamping position.
Figure 4:
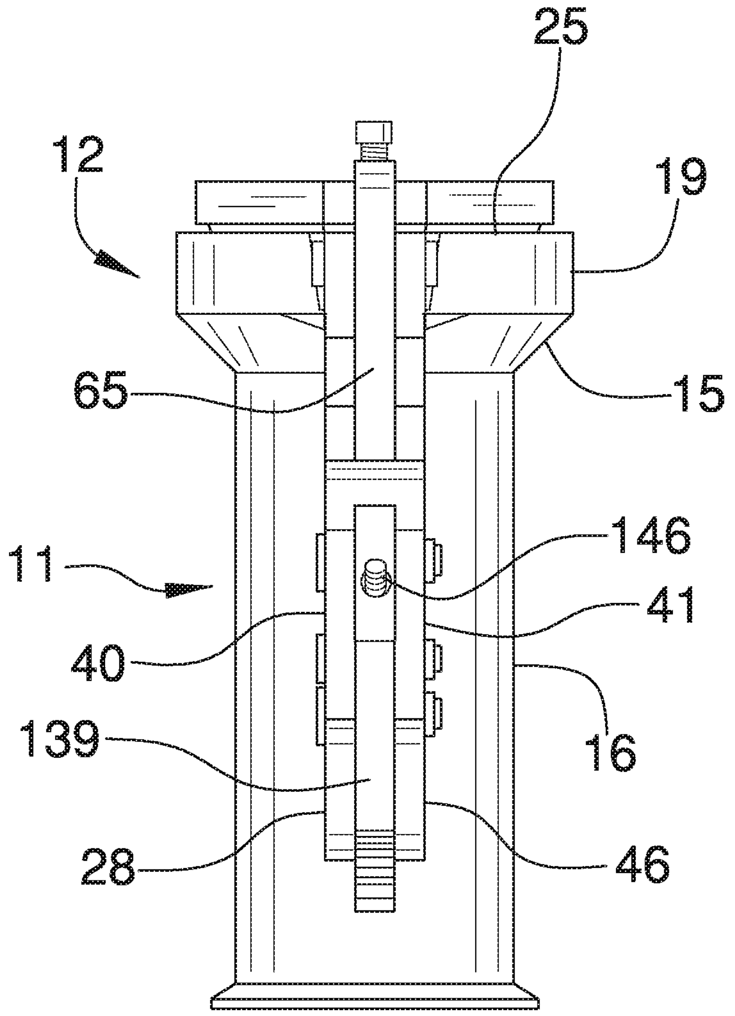
FIG. 4 is a left side view of an embodiment of the disclosure.
Figure 5:
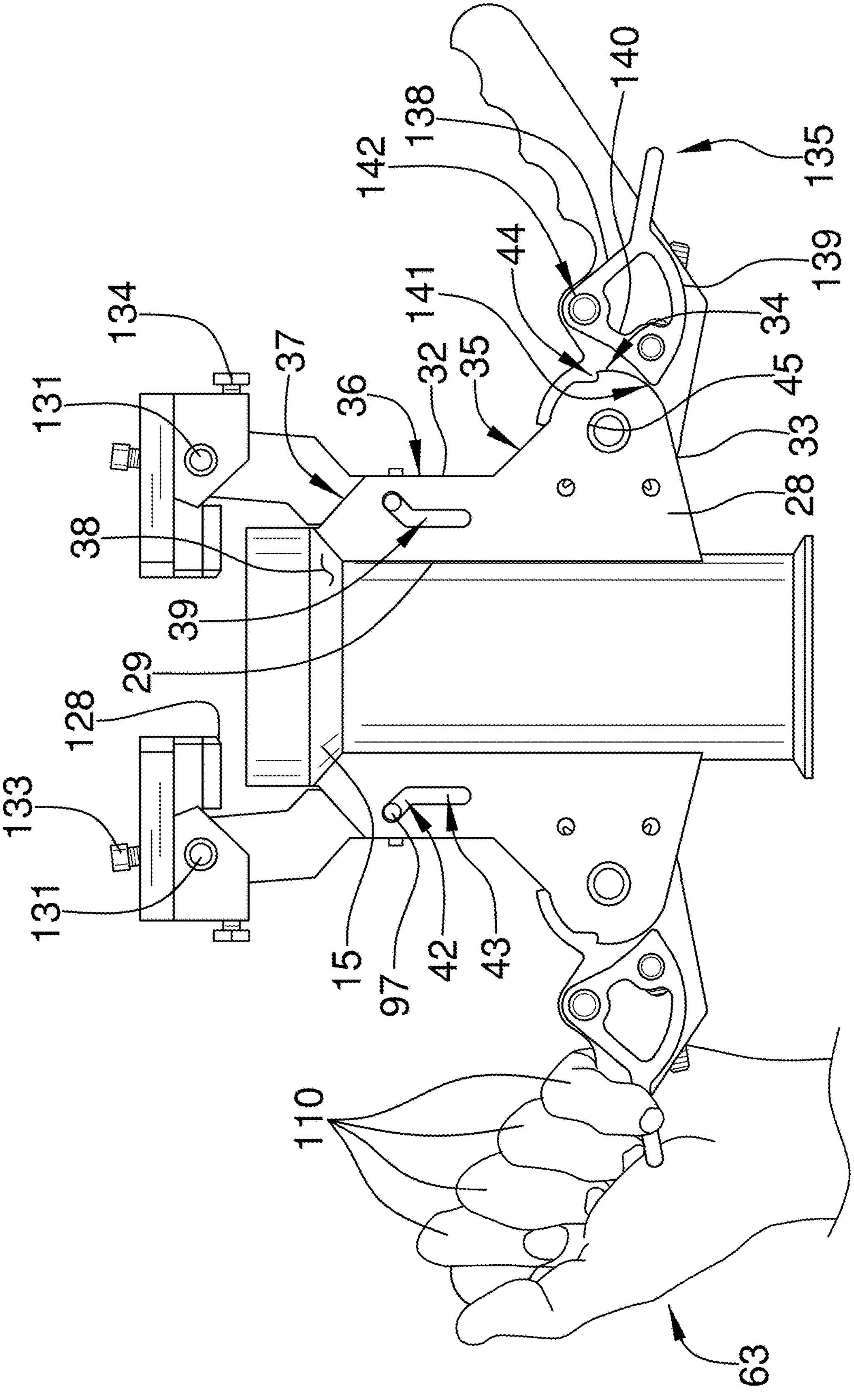
FIG. 5 is a front view of an embodiment of the disclosure showing a pair of clamping units in a releasing position.
Figure 6:
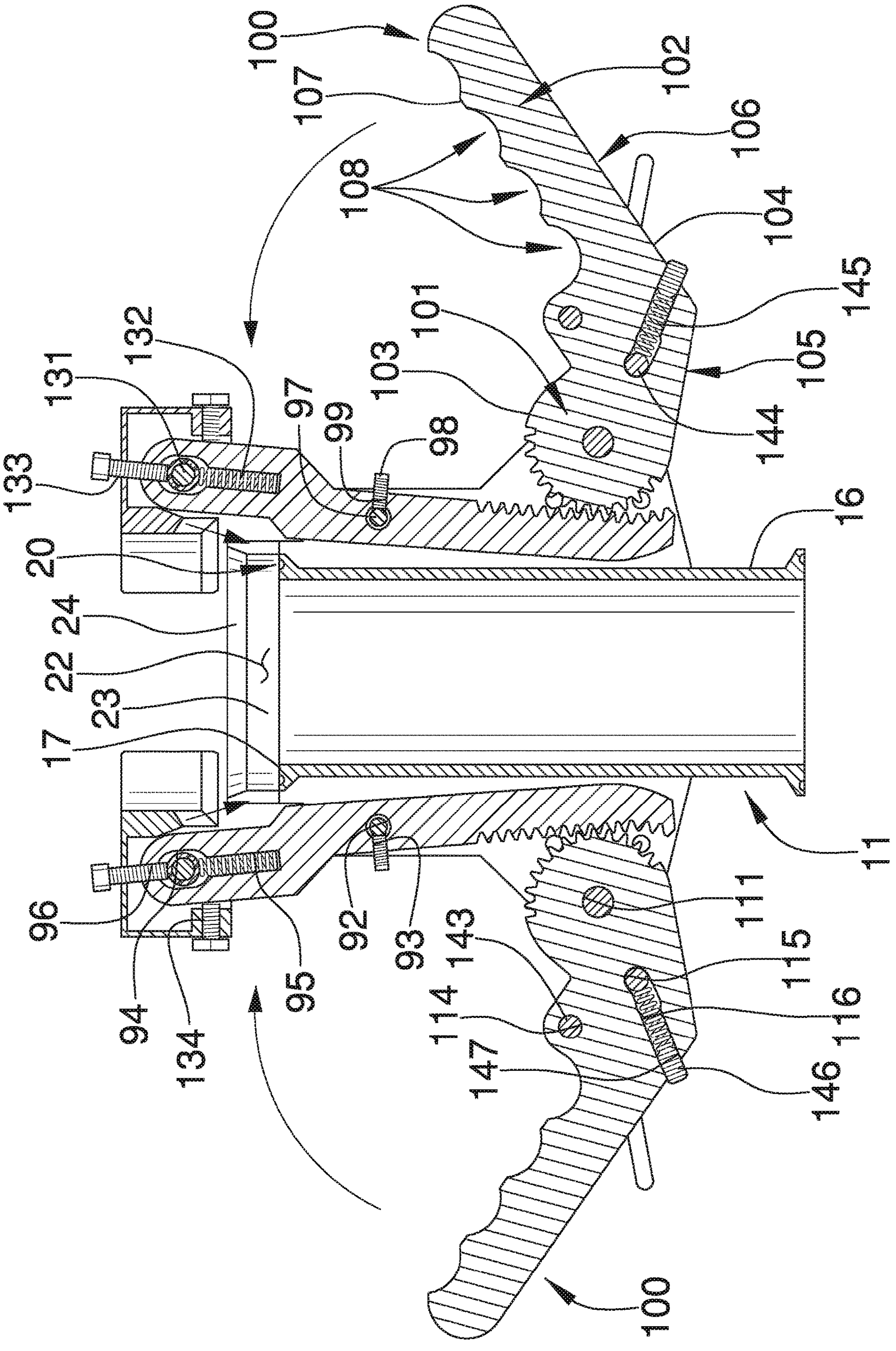
FIG. 6 is a cross sectional view taken along line 6-6 of FIG. 2 of an embodiment of the disclosure.

With reference now to the drawings, and in particular to FIGS. 1 through 12 thereof, a new clamping device embodying the principles and concepts of an embodiment of the disclosure and generally designated by the reference numeral 10 will be described.

As best illustrated in FIGS. 1 through 6, the self-centering clamping device 10 generally comprises a cylinder 11 has an upper flange 12 which can be mated to an output pipe 13 of a food product processing machine 14. The food product processing machine 14 may be a blending machine employed in a meat processing environment that handles various meat products which typically includes a significant production of grease that can cause the output pipe 13 to become slippery and difficult to grip. Furthermore, the food product processing machine 13 may be a dairy processing machine which is employed in a dairy processing environment. The upper flange 12 has an angled wall 15 which angles outwardly from an outer wall 16 of the cylinder 11 having the angled wall 15 extending around a full circumference of the outer wall 16. Furthermore, the angled wall 15 is aligned with an upper end 17 of the cylinder 11 having the angled wall 15 extending upwardly beyond the upper end 17.

Figure 7:
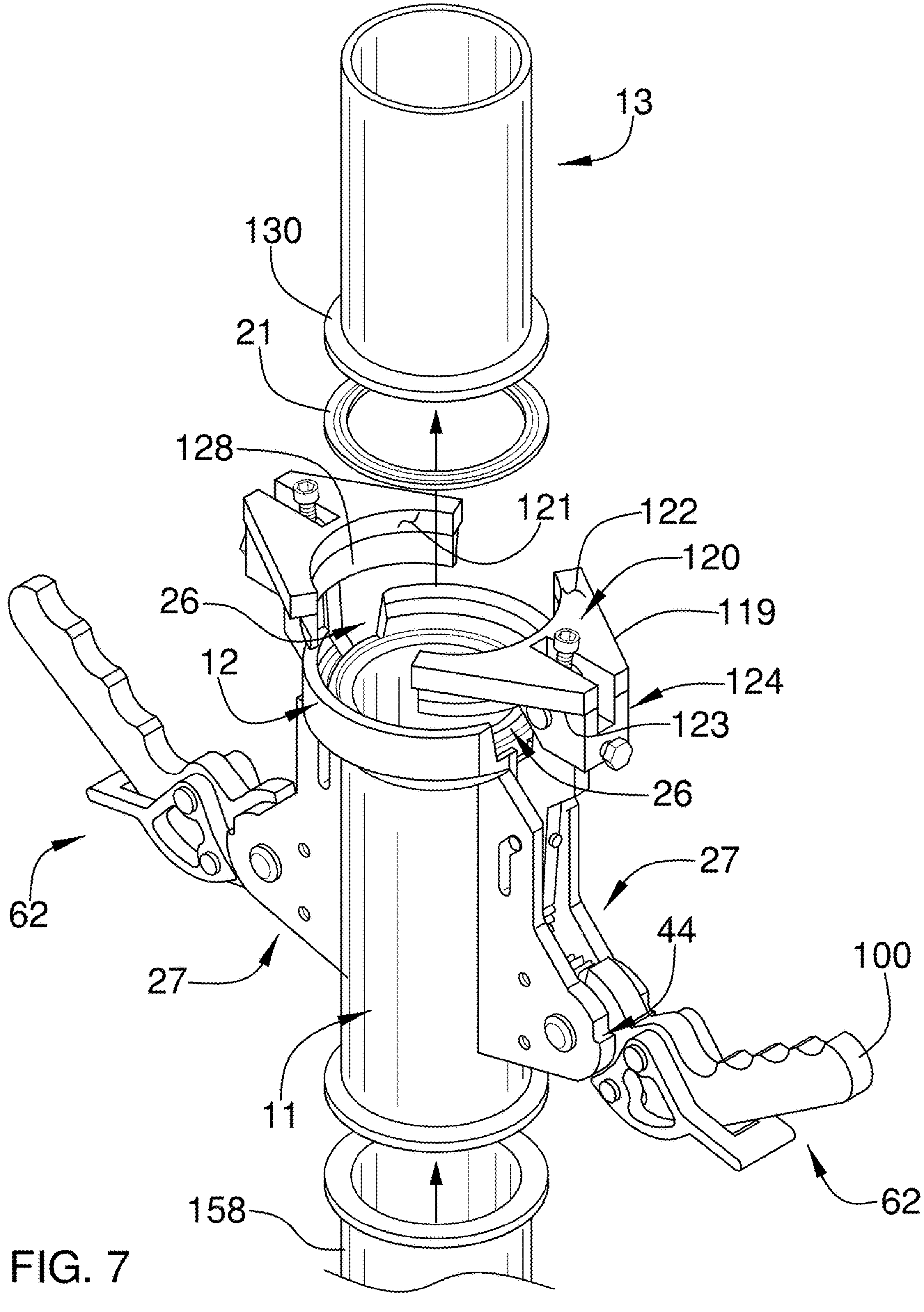
FIG. 7 is an exploded perspective view of an embodiment of the disclosure showing an output pipe being mated to a cylinder.
Figure 8:
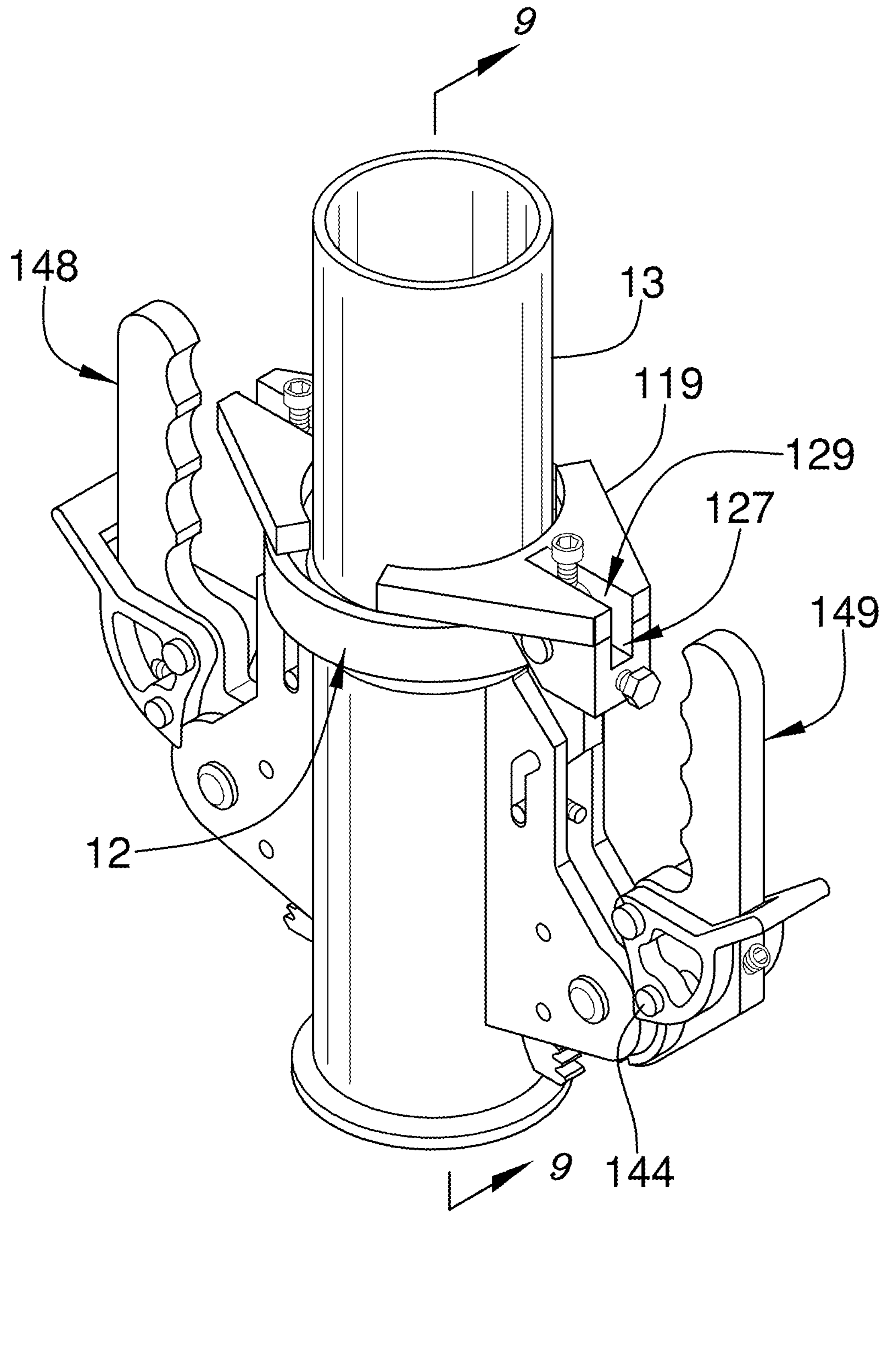
FIG. 8 is a top perspective in-use view of an embodiment of the disclosure showing a pair of clamping units securing an output pipe to a cylinder.
Figure 9:
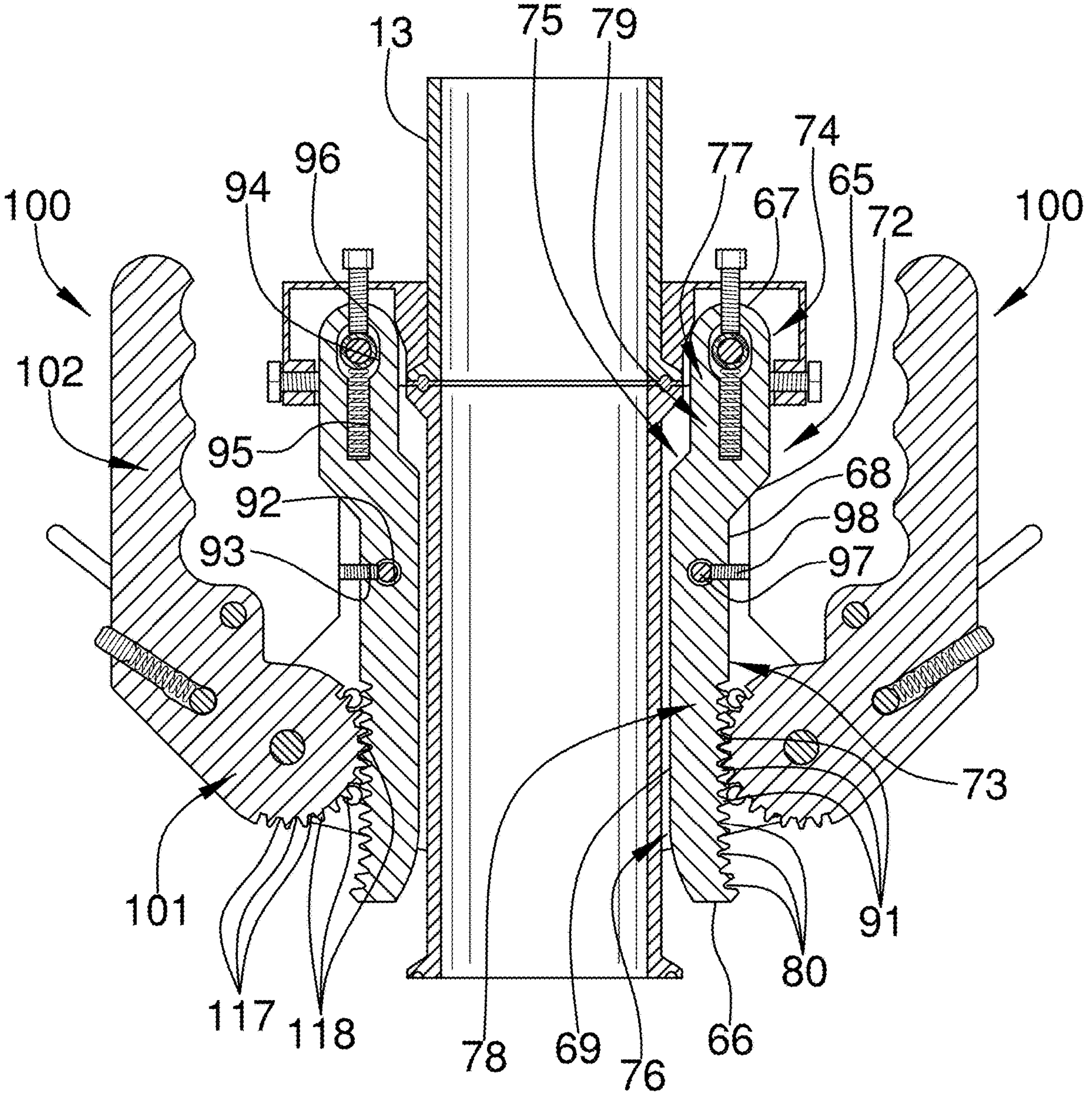
FIG. 9 is a cross sectional view taken along line 9-9 of FIG. 8 of an embodiment of the disclosure.
Figure 10:
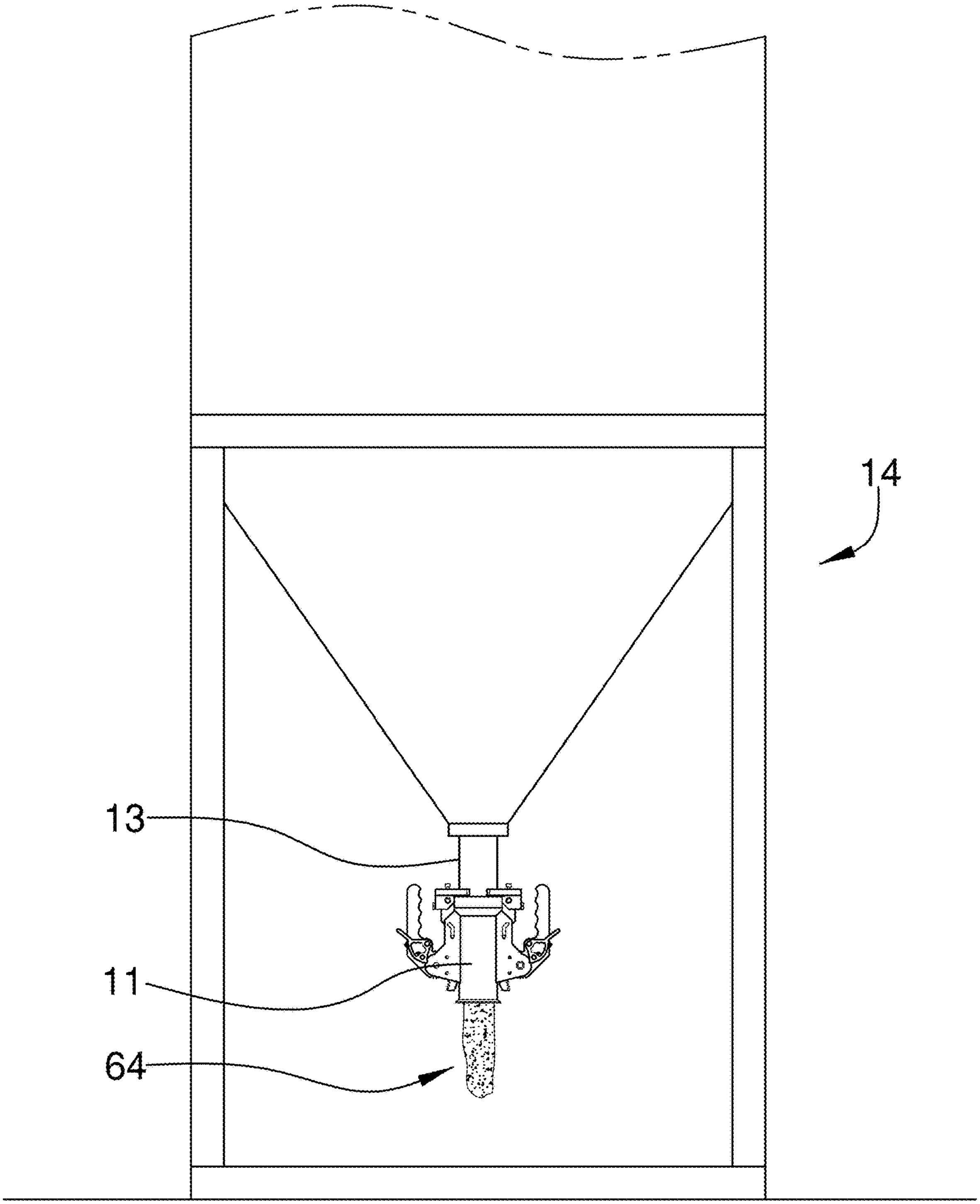
FIG. 10 is a perspective in-use view of an embodiment of the disclosure showing a cylinder being mated to an output pipe of a food product processing machine.

The upper flange 12 has an outside wall 19 extending upwardly from the angled wall 15 having the outside wall 19 extending around a full circumference of the angled wall 15. Furthermore, the outside wall 19 insertably receives the output pipe 13 of the food product processing machine 14 having the output pipe 13 of the food product processing machine 14 resting against the upper end 17 of the cylinder 11. The outside wall 19 forms a circle which has an inside diameter that is greater than an inside diameter of the outer wall 16 of the cylinder 11. Furthermore, the inside diameter of the circle formed by the outside wall 19 is greater than the outside diameter of a flange 18 of the output pipe 13 such that the upper flange 12 can insertably receive the flange 18 of the output pipe 13. The cylinder 11 has a gasket recess 20 which is recessed into the upper end 17 of the cylinder 11 and the gasket recess 20 extends around a full circumference of the upper end 17. As is shown in FIG. 7, a gasket 21 can be positioned in the gasket recess 20 to form a seal between the upper end 17 of the cylinder 11 and output pipe 13 of the food product processing machine 14. The outside wall 19 has an inwardly facing surface 22 and the inwardly facing surface 22 has a first section 23 which is perpendicularly oriented with the upper end 17 of the cylinder 11. The inwardly facing surface 22 has a second section 24 which angles outwardly between the first section 23 and a top end 25 of the outside wall 19. The outside wall 19 has a pair of cutouts 26 each extending between the top end 25 of the outside wall 19 and the angled wall 15 and the pair of cutouts 26 is positioned on opposite sides of the outside wall 19 from each other.

A pair of clamp mounts 27 is provided and each clamp mount 27 of the pair of clamp mounts 27 is coupled to the cylinder 11. Additionally, the pair of clamp mounts 27 is positioned on opposite sides of the cylinder 11 from each other. Each clamp mount 27 of the pair of clamp mounts 27 includes a first wall 28 which has a back edge 29 that is coupled to an outer surface 30 of the outer wall 16 of the cylinder 11. The first wall 28 is oriented to extend from the angled wall 15 of the upper flange 12 toward a lower end 31 of the cylinder 11. The first wall 28 has a front edge 32 that is spaced from the outer surface 30 of the outer wall 16 and the first wall 28 has a bottom edge 33 extending between the front edge 32 and the back edge 29. Furthermore, the front edge 32 has a rounded portion 34 which intersects the bottom edge 33 and a first angled portion 35 which angles toward the back edge 29 from the rounded portion 34.

The front edge 32 has a vertical portion 36 which extends between the first angled portion 35 and a second angled portion 37 of the front edge 32 and the vertical portion 36 lies on a plane which is oriented parallel to the back edge 29. Furthermore, the second angled portion 37 angles inwardly between the vertical portion 36 and a lower surface 38 of the angled wall 15 of the upper flange 12. The first wall 28 has a first slot 39 extending through a first lateral surface 40 and a second lateral surface 41 of the first wall 28. The first slot 39 has a primary section 42 which is oriented to angle downwardly between the vertical portion 36 of the front edge 32 of the first wall 28 and the back edge 29 of the first wall 28. Additionally, the first slot 39 has a secondary section 43 extending downwardly from the primary section 42 having the secondary section 43 being oriented parallel to the back edge 29 of the first wall 28.

The front edge 32 has a notch 44 that is recessed into the rounded portion 34 and the notch 44 in the rounded portion 34 is positioned between the bottom edge 33 and the first angled portion 35 of the front edge 32. The first wall 28 has a first pin hole 45 extending through the first lateral surface 40 of the first wall 28 and the second lateral surface 41 of the first wall 28. Furthermore, the first pin hole 45 is spaced from the bottom edge 33 of the first wall 28 such that the rounded portion 34 of the front edge 32 curves around the first pin hole 45.

Each clamp mount 27 of the pair of clamp mounts 27 includes a second wall 46 that has a rear edge 47 which is coupled to the outer surface 30 of the outer wall 16 of the cylinder 11. The second wall 46 extends between the angled wall 15 of the upper flange 12 toward the lower end 31 of the cylinder 11 and the second wall 46 is spaced from the first wall 28. The second wall 46 has a forward edge 49 which is spaced from the outer surface 30 of the outer wall 16 and the second wall 46 has a lower edge 50 extending between the forward edge 49 and the rear edge 47. The forward edge 49 has a rounded portion 51 of the forward edge 49 which intersects the lower edge 50 and a first angled portion 52 of the forward edge 49 which angles toward the rear edge 47 from the rounded portion 51 of the forward edge 49. Furthermore, the forward edge 49 has a vertical portion 53 of the forward edge 49 which extends between the first angled portion 52 of the forward edge 49 and a second angled portion 54 of the forward edge 49. The vertical portion 53 of the forward edge 49 lies on a plane that is oriented parallel to the rear edge 47 and the second angled portion 54 of the forward edge 49 angles inwardly between the vertical portion 53 of the forward edge 49 and the lower surface 38 of the angled wall 15 of the upper flange 12.

The second wall 46 has a second slot 55 extending through a first lateral surface 56 of the second wall 46 and a second lateral surface 57 of the second wall 46. The second slot 55 has a primary section 58 of the second slot 55 which is oriented to angle downwardly between the vertical portion 53 of the forward edge 49 and the rear edge 47 of the second wall 46. Additionally, the second slot 55 has a secondary section 59 of the second slot 55 extending downwardly from the primary section 58 of the second slot 55 having the secondary section 59 of the second slot 55 being oriented parallel to the rear edge 47 of the second wall 46. The forward edge 49 has a notch 60 in the forward edge 49 which is recessed into the rounded portion 34 and the notch 44 in the rounded portion 51 of the forward edge 49 is positioned between the lower edge 50 the first angled portion 52 of the forward edge 49. The second wall 46 has a second pin hole 61 extending through the first lateral surface 56 of the second wall 46 and the second lateral surface 57 of the second wall 46. Additionally, the second pin hole 61 is spaced from the bottom edge 33 of the second wall 46 having the rounded portion 51 of the forward edge 49 curving around the second pin hole 61.

A pair of clamping units 62 is provided and each clamping unit 62 of the pair of clamping units 62 is pivotally coupled to a respective clamp mount 27 of the pair of clamp mounts 27 such that each clamping unit 62 of the pair of clamping units 62 can be manipulated by a user 63. Each clamping unit 62 of the pair of clamping units 62 is urgeable into a clamping position having each clamping unit 62 of the pair of clamping units 62 being positioned over the upper flange 12 to subsequently engage the output pipe 13. Furthermore, each clamping unit 62 of the pair of clamping units 62 secures the output pipe 13 of the food product processing machine 14 in the upper flange 12 such that a food product 64 can flow through the cylinder 11 when the clamping units 62 are in the clamping position. Each clamping unit 62 of the pair of clamping units 62 is urgeable into a releasing position having each clamping unit 62 of the pair of clamping units 62 being spaced upwardly from the upper flange 12 and being laterally spaced from the upper flange 12. Furthermore, the pair of clamping units 62 releases the output pipe 13 of the food product processing machine 14 such that the cylinder 11 can be removed from the output pipe 13 of the food product processing machine 14 when the clamping units 62 are urged into the releasing position.

Each clamping unit 62 of the pair of clamping units 62 includes an arm 65 which has a bottom end 66 and a top end 67 of the arm 65 and a front edge 68 of the arm 65 and a back edge 69 of the arm 65. The arm 65 has a first sidelong surface 70 and a second sidelong surface 71 each extending between the bottom end 66 of the arm 65 and the top end 67 of the arm 65. The front edge 68 of the arm 65 has a front angled portion 72 angling outwardly between a lower portion 73 and an upper portion 74 of the front edge 68 of the arm 65. The back edge 69 of the arm 65 has a back angled portion 75 angling toward the front edge 68 of the arm 65 between a bottom portion 76 and a top portion 77 of the back edge 69 of the arm 65 and the back angled portion 75 is oriented parallel to the front angled portion 72. Furthermore, each of the lower portion 73 of the front edge 68 of the arm 65 and the bottom portion 76 of the back edge 69 of the arm 65 defines a lower section 78 of the arm 65. Additionally, each of the upper portion 74 of the front edge 68 of the arm 65 and the top portion 77 of the back edge 69 of the arm 65 defines an upper section 79 of the arm 65 and the upper section 79 is offset from the lower section 78 of the arm 65. The lower section 78 is associated with the bottom end 66 of the arm 65 and the upper section 79 is associated with the top end 67 of the arm 65. The upper section 79 is spaced a greater distance from the outer wall 16 of the cylinder 11 than a distance between the lower section 78 and the outer wall 16.

The front edge 68 of the arm 65 has a plurality of tooth depressions 80 each extending toward the back edge 69 of the arm 65. The plurality of tooth depressions 80 is evenly spaced apart from each other and is distributed from the bottom end 66 of the arm 65 toward the front angled portion 72 of the front edge 68 of the arm 65 to define a plurality of teeth 91 on the front edge 68 of the arm 65. The arm 65 associated with each of the pair of clamping units 62 is positioned between the first wall 28 and the second wall 46 of a respective one of the pair of clamp mounts 27. The arm 65 has a primary pin hole 92 extending through the first sidelong surface 70 and the second sidelong surface 71 and the primary pin hole 92 is positioned on the lower section 78 of the arm 65 at a point located closer to the front angled portion 72 of the front edge 68 of the arm 65 than the bottom end 66 of the arm 65. The arm 65 has a set screw well 93 extending into the lower portion 73 of the front edge 32 and intersecting the primary pin hole 92.

The arm 65 has a secondary pin hole 94 extending through the first sidelong surface 70 and the second sidelong surface 71 and the secondary pin hole 94 is located on the upper section 79 of the arm 65. Additionally, the secondary pin hole 94 is located closer to the top end 67 of the arm 65 than the back angled portion 75 of the back edge 69 of the arm 65. The secondary pin hole 94 is elongated along an axis extending between the top end 67 of the arm 65 and the bottom end 66 of the arm 65 such that the secondary pin hole 94 has an ovoid shape. The arm 65 has a spring well 95 located within the arm 65 and the spring well 95 extends from the secondary pin hole 94 toward the lower section 78 of the arm 65. Additionally, the arm 65 has a screw hole 96 extending into the top end 67 of the arm 65 and intersecting the secondary pin hole 94.

Each clamping unit 62 of the pair of clamping units 62 includes a first pin 97 extending through the primary pin hole 92. The first pin 97 extends through the first slot 39 in the first wall 28 of a respective one of the pair of clamp mounts 27 and the first pin 97 extends through the second slot 55 in the second wall 46 of the respective clamp mount 27. The arm 65 is oriented to travel upwardly along the outer wall 16 of the cylinder 11 when the first pin 97 travels along the secondary section 43 of the first slot 39 and the secondary section 59 of the second slot 55. Furthermore, the arm 65 is oriented to angle away from the outer wall 16 of the cylinder 11 when the first pin 97 travels along the primary section 42 of the first slot 39 and the primary section 58 of the second slot 55.

Each clamping unit 62 of the pair of clamping units 62 includes a first set screw 98 extending through the set screw well 93 in the lower portion 73 of the front edge 32 of the arm 65. The first set screw 98 threadably engages a bounding surface 99 of the set screw well 93. Furthermore, the first set screw 98 compresses against the first pin 97 when the first set screw 98 is tightened in the set screw well 93 for retaining the first pin 97 in the arm 65. Conversely, the first set screw 98 is displaced from the first pin 97 when the first set screw 98 is loosened such that the first pin 97 is removable from the arm 65.

Each clamping unit 62 of the pair of clamping units 62 includes a lever 100 which has a lobed section 101 and a grip section 102 angling away from the lobed section 101. The lobed section 101 has an outer edge 103 which is continuously arcuate about a center of the lobed section 101 such that the lobed section 101 has a rounded shape. The grip section 102 has frontmost edge 104 which has a lower section 105 of the frontmost edge 104 extending between the outer edge 103 of the lobed section 101 and an upper section

106 of the frontmost edge 104 angling upwardly from the lower section 105 of the frontmost edge 104. The grip section 102 has a rearmost edge 107 which is oriented parallel to the upper section 106 of the frontmost edge 104 and intersects the outer edge 103 of the lobed section 101. Additionally, the rearmost edge 107 has a plurality of depressions 108 evenly spaced apart from each other. Each of the plurality of depressions 108 has a bounding edge 109 which is concavely arcuate with respect to the frontmost edge 104 to conform to the shape of fingers 110 of the user 63 when the user 63 grips the grip section 102 of the lever 100.

The lever 100 has a pin aperture 111 extending through a first lateral surface 112 of the lever 100 and a second lateral surface 113 of the lever 100. The pin aperture 111 is centrally located on the lobed section 101 such that the outer edge 103 of the lobed section 101 curves around the pin aperture 111. The lever 100 has a primary pin hole 114 in the lever 100 extending through the first lateral surface 112 of the lever 100 and the second lateral surface 113 of the lever 100. Additionally, the primary pin hole 114 in the lever 100 is located proximate an intersection between the outer edge 103 of the lobed section 101 of the lever 100 and the rearmost edge 107 of the grip section 102 of the lever 100. The lever 100 has a secondary pin hole 115 in the lever 100 extending through the first lateral surface 112 of the lever 100 and the second lateral surface 113 of the lever 100; the secondary pin hole 115 in the lever 100 is positioned between the primary pin hole 114 in the lever 100 and the lower section 105 of the frontmost edge 104 of the grip section 102. Additionally, the secondary pin hole 115 in the lever 100 is elongated along an axis extending between the pin aperture 111 and the upper section 106 of the frontmost edge 104 of the grip section 102 of the lever 100 such that the secondary pin hole 115 in the lever 100 has an ovoid shape.

The lever 100 has a spring well 116 in the lever 100 extending from the upper section 106 of the frontmost edge 104 of the grip section 102 into the secondary pin hole 115 in the lever 100. The outer edge 103 of the lobed section 101 has a plurality of tooth depressions 117 evenly spaced apart from each other and distributed along the outer edge 103 to define a plurality of teeth 118 on the outer edge 103. Furthermore, the plurality of teeth 118 on the outer edge 103 enmesh with the plurality of teeth 91 on the front edge 68 of the arm 65. The arm 65 is lifted upwardly when the lever 100 is pivoted into a first position having the lever 100 angling away from the cylinder 11 such that the first pin 97 travels along the secondary section 43 of the first slot 39 and the secondary section 59 of the second slot 55. Furthermore, the arm 65 angles away from the cylinder 11 along an axis extending between the bottom end 66 of the arm 65 and the top end 25 of the arm 65 when the first pin 97 travels along the primary section 42 of the first slot 39 and the primary section 58 of the second slot 55. Conversely, the arm 65 is lowered downwardly when the lever 100 is pivoted into a second position having the lever 100 being pivoted toward the cylinder 11; the first pin 97 travels along the primary section 42 of the first slot 39 and the primary section 58 of the second slot 55 and then travels along the secondary section 43 of the first slot 39 and the secondary section 59 of the second slot 55 such that the arm 65 is oriented parallel to the outer wall 16 of the cylinder 11.

Each clamping unit 62 of the pair of clamping units 62 includes a clamp 119 that has a clamping portion 120 which has a concave front edge 121 extending between a top surface 122 and a bottom surface 123 of the clamping portion 120. The clamp 119 has a mounting portion 124 extending downwardly from the bottom surface 123 of the clamping portion 120 and the mounting portion 124 has a bottom end 125 of the mounting portion 124 and a front side 126. The mounting portion 124 has a slot 127 extending from the bottom end 125 of the mounting portion 124 toward the bottom surface 123 of the clamping portion 120. Additionally, the clamp 119 has a lip 128 extending downwardly from the bottom surface 123 of the clamping portion 120 and the lip 128 is aligned with and is co-arcuate with the concave front edge 121. The clamping portion 120 has a slot 129 in the clamping portion 120 extending through the top surface 122 and the bottom surface 123 and the slot 129 in the clamping portion 120 intersects the slot 127 in the mounting portion 124. The top end 25 of the arm 65 is positioned in the slot 127 in the mounting portion 124 such that the clamp 119 is spaced upwardly from the upper flange 12 of the cylinder 11; the concave front edge 121 is aligned with the first section 23 of the inwardly facing surface 22 of the outside wall 19 of the upper flange 12 and the mounting portion 124 is aligned with a respective cutout 26 of the pair of cutouts 26 in the outside wall 19 of the upper flange 12.

The lip 128 is spaced inwardly from the inwardly facing surface 22 of the outside wall 19 of the upper flange 12 and travels downwardly toward the upper end 17 of the cylinder 11 and the mounting portion 124 extends into the respective cutout 26 in the outside wall 19 of the upper flange 12 when the lever 100 is pivoted toward the cylinder 11. Furthermore, the concave front edge 121 of the clamping portion 120 extends around the output pipe 13 thereby centering the output pipe 13 over the cylinder 11 when the lever 100 is pivoted toward the cylinder 11. Additionally, the lip 128 compresses a flange 130 of the output pipe 13 of the food product processing machine 14 against the upper end 17 of the cylinder 11 when the lever 100 is pivoted toward the cylinder 11. Conversely, the lip 128 travels upwardly beyond the upper flange 12 on the cylinder 11 having the concave front edge 121 of the clamping portion 120 being spaced outwardly from the first section 23 of the inwardly facing surface 22 of the outside wall 19 of the upper flange 12 when the lever 100 is pivoted away from the cylinder 11. Furthermore, the clamp 119 is displaced from the output pipe 13 of the food product processing machine 14 such that the cylinder 11 can be removed from the output pipe 13 when the lever 100 is pivoted away from the cylinder 11.

Each clamping unit 62 of the pair of clamping units 62 includes a clamp pin 131 extending laterally through the mounting portion 124 of the clamp 119 and extending through the second pin hole 61 in the arm 65 such that the mounting portion 124 is pivotally coupled to the arm 65. Each clamping unit 62 of the pair of clamping units 62 includes a first biasing member 132 which is positioned in the spring well 95 in the arm 65. The first biasing member 132 abuts the clamp pin 131 such that the first biasing member 132 biases the clamp pin 131 to travel toward the top end 67 of the arm 65. Each clamping unit 62 of the pair of clamping units 62 includes a second set screw 133 which extends through the screw hole 96 in the upper end 17 of the arm 65 and the second set screw 133 compresses against the clamp pin 131. The second set screw 133 urges the clamp pin 131 to travel downwardly in the second pin hole 61 when the second set screw 133 is tightened to adjust a height of the clamp 119 with respect to the upper flange 12 of the cylinder 11.

Each clamping unit 62 of the pair of clamping units 62 includes a third set screw 134 which extends through the front side 126 of the mounting portion 124 of the clamp 119.

The third set screw 134 abuts against the upper portion 74 of the front edge 68 of the arm 65. Furthermore, the third set screw 134 urges the clamp 119 to travel toward the upper flange 12 of the cylinder 11 when the third set screw 134 is tightened to adjust the clamp 119 to accommodate the diameter of the flange 18 of the output pipe 13 of the food product processing machine 14.

Each clamping unit 62 of the pair of clamping units 62 includes a lock 135 which comprises a medial member 136 extending between and being perpendicular to a pair of outward members 137. Each outward member 137 of the pair of outward members 137 has an angled portion 138 angling upwardly from a respective outward member 137. Additionally, each outward member 137 of the pair of outward members 137 has a curved portion 139 curving downwardly and forwardly from a respective outward member 137. Each outward member 137 of the pair of outward members 137 has a distal portion 140 extending between the angled portion 138 and the curved portion 139. Additionally, the distal portion 140 of a respective outward member 137 intersects the curved portion 139 of the respective outward member 137 at a locking point 141 which protrudes beyond the distal portion 140. The distal portion 140 of a respective outward member 137 intersects the angled portion 138 of the respective outward member 137 at a pivot point 142. Furthermore, the lever 100 is positioned between the pair of outward members 137 having the medial member 136 being spaced from the frontmost edge 104 of the grip section 102 of the lever 100 such that the medial member 136 can be manipulated by the user 63.

Each clamping unit 62 of the pair of clamping units 62 includes a first lock pin 143 extending through the pivot point 142 associated with each outward member 137 of the pair of outward members 137 of the lock 135. Additionally, the first lock pin 143 extends through the primary pin hole 114 in the lever 100 to pivotally attach the lock 135 to the lever 100. Each clamping unit 62 of the pair of clamping units 62 includes a second lock pin 144 extending through each outward member 137 of the pair of outward members 137 at a point located adjacent to the locking point 141 associated with each outward member 137 of the pair of outward members 137. Additionally, the second lock pin 144 extends through secondary pin hole 115 in the lever 100.

Each clamping unit 62 of the pair of clamping units 62 includes a second biasing member 145 that is positioned in the spring well 95 in the lever 100 such that the second biasing member 145 biases the second lock pin 144 to travel in the secondary pin hole 115 in the lever 100 toward pin aperture 111 in the lever 100. Each clamping unit 62 of the pair of clamping units 62 includes a thumb screw 146 which threadably engages a bounding surface 147 of the spring well 95. The thumb screw 146 compresses the second biasing member 145 when the thumb screw 146 is tightened to increase a spring force of the second biasing member 145. Conversely, the thumb screw 146 decompresses the second biasing member 145 when the thumb screw 146 is loosened to decrease the spring force of the second biasing member 145. The thumb screw 146 may comprise a set screw that can be engaged with an allen wrench, for example, or other similar type of adjustment screw.

The pair of clamping units 62 includes a first clamping unit 148 and a second clamping unit 149. The lock 135 associated with the first clamping unit 148 is biased into a locking position having the locking point 141 associated with a respective outward member 137 of the pair of outward members 137 of the lock 135 associated with the first clamping unit 148 positioned in the notch 44 in the front edge 32 of the first wall 28 of a respective clamp mount 27; the locking point 141 associated with a respective outward member 137 of the pair of outward members 137 associated with the first clamping unit 148 is positioned in the notch 60 in the forward edge 49 of the second wall 46 of the respective clamp mount 27 to retain the lever 100 associated with the first clamping unit 148 in the second position. The lock 135 associated with the first clamping unit 148 is urgeable into an unlocking position having the locking point 141 associated with a respective outward member 137 of the pair of outward members 137 of the lock 135 associated with the first clamping unit 148 being displaced from the notch 44 in the front edge 32 of the first wall 28 of the respective clamp mount 27; the locking point 141 associated with the respective outward member 137 of the lock 135 associated with the first clamping unit 148 is displaced from the notch 60 in the forward edge 49 of the second wall 46 of the respective clamp mount 27 such that the lever 100 can be pivoted into the first position.

The lock 135 associated with the second clamping unit 149 is biased into a locking position having the locking point 141 associated with a respective outward member 137 of the pair of outward members 137 of the lock 135 associated with the second clamping unit 149 being positioned in the notch 44 in the front edge 32 of the first wall 28 of a respective clamp mount 27; the locking point 141 associated with a respective outward member 137 of the pair of outward members 137 associated with the second clamping unit 149 is positioned in the notch 60 in the forward edge 49 of the second wall 46 of the respective clamp mount 27 to retain the lever 100 associated with the second clamping unit 149 in the second position. The lock 135 associated with the second clamping unit 149 is urgeable into an unlocking position having the locking point 141 associated with a respective outward member 137 of the pair of outward members 137 of the lock 135 associated with the second clamping unit 149 being displaced from the notch 44 in the front edge 32 of the first wall 28 of the respective clamp mount 27; the locking point 141 associated with the respective outward member 137 of the lock 135 associated with the second clamping unit 149 is displaced from the notch 60 in the forward edge 49 of the second wall 46 of the respective clamp mount 27 such that the lever 100 can be pivoted into the first position.

Figure 11:
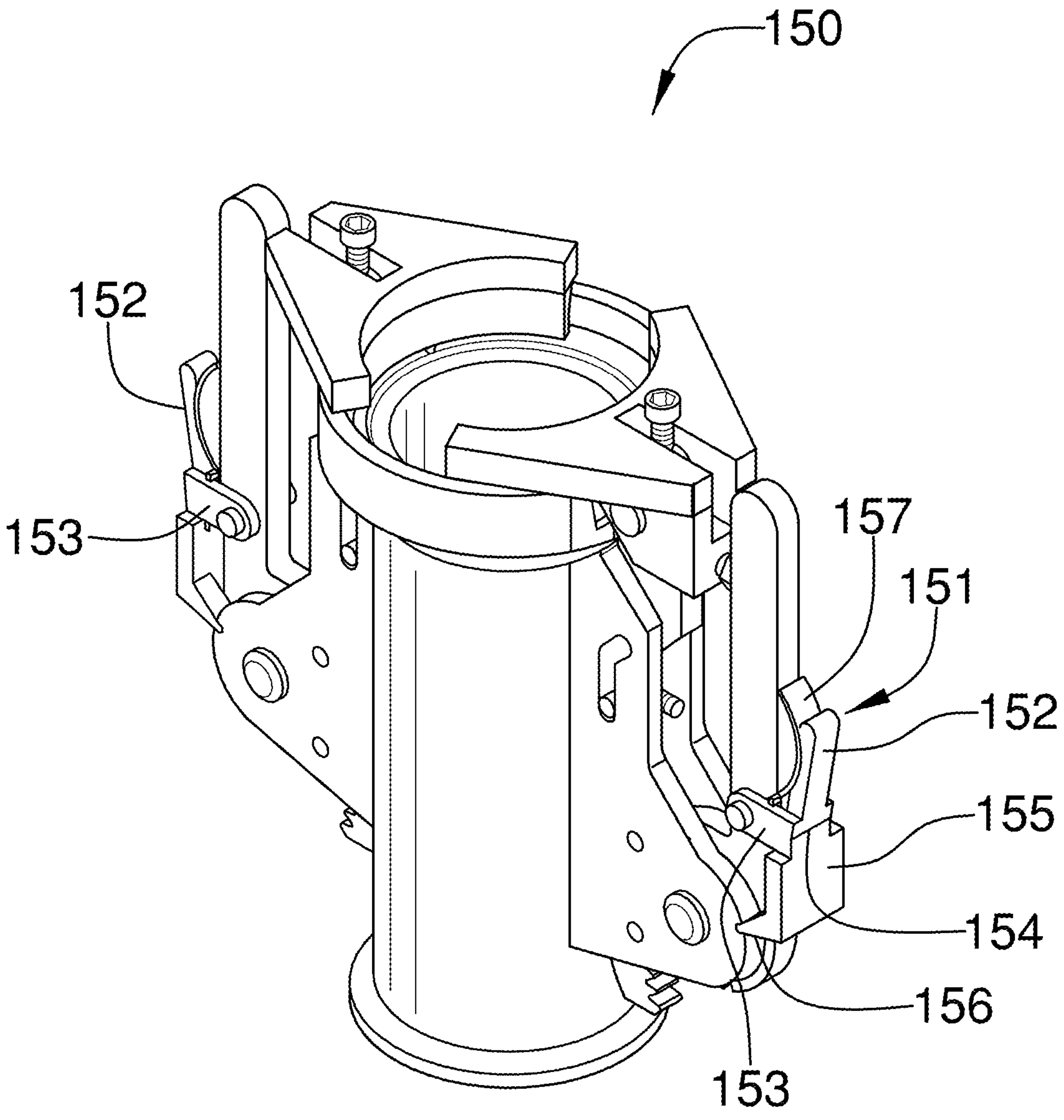
FIG. 11 is a top perspective view of an alternative embodiment of the disclosure showing a pair of clamping units in a clamping position.
Figure 12:
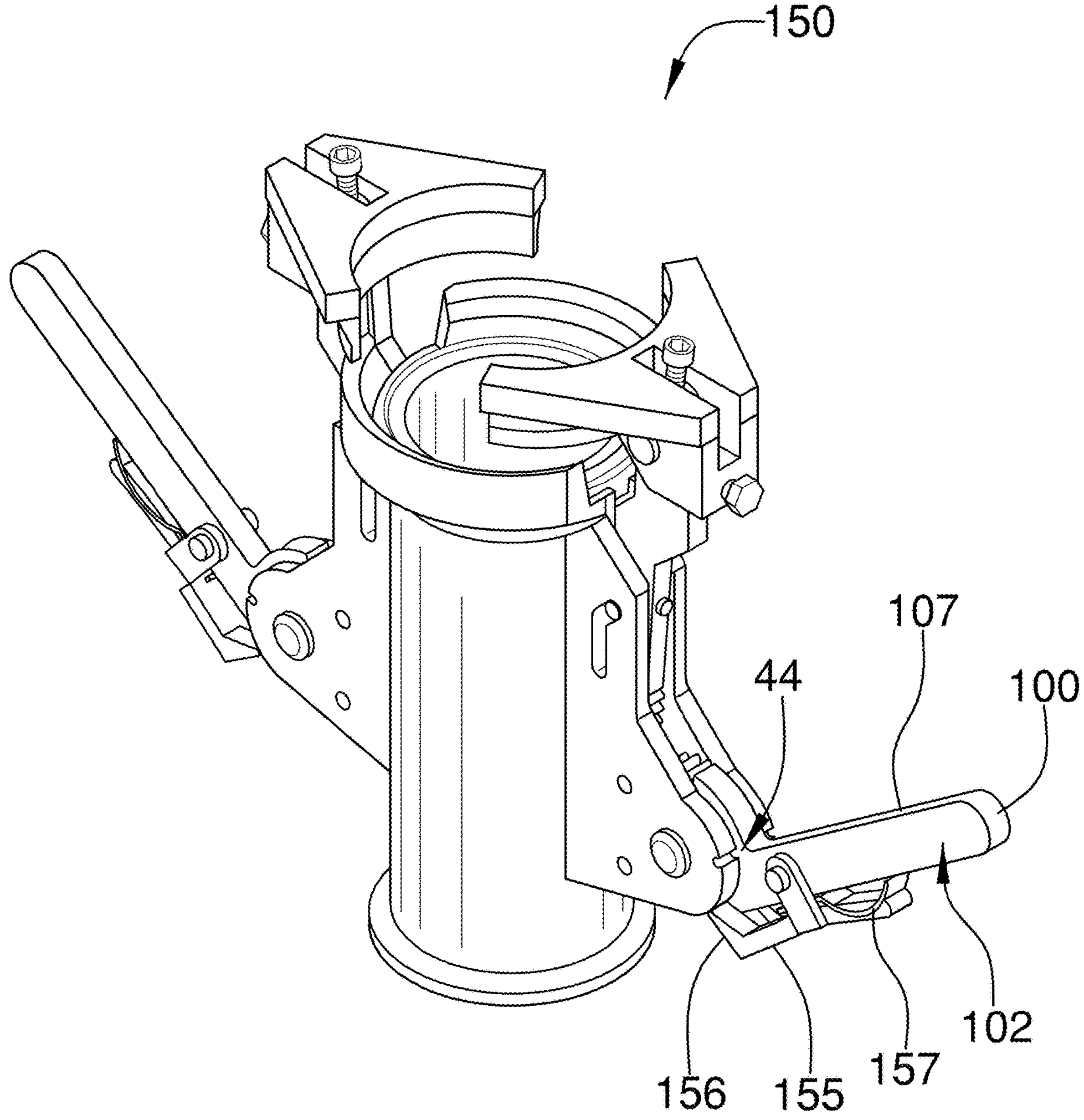
FIG. 12 is a top perspective view of an alternative embodiment of the disclosure showing a pair of clamping units in a releasing position.

In an alternative embodiment 150 as shown in FIGS. 11 and 12, the rearmost edge 107 of the grip section 102 of the lever 100 is planar and is oriented parallel to the frontmost edge 104 of the grip section 102 of the lever 100. The lock 135 associated with each clamping unit 62 of the pair of clamping units 62 comprises a handle portion 151 which includes a first member 152 and a pair of sidelong members 153 each extending forwardly from the first member 152 at a point aligned with a bottom end 154 of the first member 152. The pair of sidelong members 153 are spaced apart from each other and are oriented parallel to each other having the grip section 102 of the lever 100 being positioned between the pair of sidelong members 153 of the lock 135 and having the first lock pin 143 extending through each of the pair of sidelong members 153 such that the first member 152 extends upwardly along the frontmost edge 104 of the grip section 102 of the lever 100. The lock 135 associated with each clamping unit 62 of the pair of clamping units 62 includes a panel 155 extending downwardly from bottom end 154 of the first member 152 such that the panel 155 is spaced from and lies on a plane oriented parallel to the frontmost edge 104 of the grip section 102 of the lever 100. The lock 135 associated with each clamping unit 62 of the pair of clamping units 62 includes a pair of fingers 156 each extending forwardly from the panel 155 having each of the pair of fingers 156 being spaced apart from each other. Furthermore, each of the fingers 156 extends into the notch 60 in the forward edge 49 of the second wall 46 of the respective clamp mount 27 when the lock 135 associated with each clamping unit 62 is positioned in the locking position. The lock 135 associated with each clamping unit 62 of the pair clamping units 62 includes a spring 157 which is positioned between the first member 152 of the handle portion 151 and the frontmost edge 104 of the grip section 102 of the lever 100 which biases the first member 152 away from the frontmost edge 104. The first member 152 of the handle portion 151 is urgeable toward the frontmost edge 104 to displace each finger 156 of the pair of fingers 156 from the notch 60 in the forward edge 49 of the second wall 46 of the respective clamp mount 27 to enable the lock 135 to be pivoted into the unlocking position.

In use, the lever 100 of each clamping unit 62 of the pair of clamping units 62 is pivoted into the first position to urge each clamping unit 62 of the pair of clamping units 62 releasing position such that the output pipe 13 of the food product processing machine 14 can be inserted into the upper flange 12 of the cylinder 11. The lever 100 of each clamping unit 62 of the pair of clamping units 62 is pivoted into the second position to urge each clamping unit 62 of the pair of clamping units 62 into the clamping position to clamp 119 the output pipe 13 of the food produce processing machine against the upper end 17 of the cylinder 11. Additionally, the lock 135 associated with each clamping unit 62 of the pair of clamping units 62 locks the lever 100 of each clamping unit in the second position to secure the cylinder 11 on the output pipe 13 of the food product processing machine 14. The pair of clamping units 62 centers the cylinder 11 on the output pipe 13 when the clamping units 62 are urged into the clamping position. As is shown in FIGS. 1 through 12, a lower flange 158 is attached to the lower end 31 of the cylinder 11 which can be mated to a conduit 159 which to receive the food product 64. Consequently, the food product 64 that flows through the output pipe 13 of the food product processing machine 14 flows through the cylinder 11 such that the conduit 159 which has been mated to the lower flange 158 of the cylinder 11 can receive the food product 64. The cylinder 11 can be attached to the output pipe 13 of the food product processing machine 14 in the event that the food product processing machine 14 has experienced a malfunction which results in the food product 64 free flowing from the output pipe 13 of the food product processing machine 14. The mechanical advantage produced by the lever 100 and the arm 65 of each clamping unit 62 of the pair of clamping units 62 enables the user 63 to overcome the pressure of the food product 64 that is free flowing to secure the cylinder 11 to the output pipe 13 in a situation that would otherwise be impossible for the user 63. Consequently, the free flowing food product 64 can be directed into the conduit 159 which is attached to the lower end 31 of the cylinder 11 to handle the free flowing food product 64 in a safe manner until the malfunction can be corrected.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A self-centering clamping device being matable to an output pipe of a food product processing machine, said device comprising:

a cylinder having an upper flange wherein said upper flange is configured to be mated to the output pipe of the food product processing machine;

a pair of clamp mounts, each clamp mount of said pair of clamp mounts being coupled to said cylinder, said pair of clamp mounts being positioned on opposite sides of said cylinder from each other;

a pair of clamping units, each clamping unit of said pair of clamping units being pivotally coupled to a respective clamp mount of said pair of clamp mounts wherein each clamping unit of said pair of clamping units is configured to be manipulated by a user, each clamping unit of said pair of clamping units being urgeable into a clamping position having each clamping unit of said pair of clamping units being positioned over said upper flange wherein each clamping unit of said pair of clamping units is configured to secure the output pipe of the food product processing machine in said upper flange such that a food product can flow through said cylinder, each clamping unit of said pair of clamping units being urgeable into a releasing position having each clamping unit of said pair of clamping units being spaced upwardly from said upper flange and being laterally spaced from said upper flange wherein said pair of clamping units is configured to release the output pipe of the food product processing machine such that said cylinder can be removed from the output pipe of said food product processing machine, each clamping unit of said pair of clamping units includes a clamp being curved to extend partially around an outlet pipe cylinder of the outlet pipe wherein said clamp is configured to center said cylinder on the output pipe;

wherein said upper flange has an angled wall angling outwardly from an outer wall of said cylinder having said angled wall extending around a full circumference of said outer wall;

wherein said angled wall is spaced a distance away from an upper end of the cylinder;

wherein said upper flange has an outside wall extending upwardly from said angled wall having said outside wall extending around at least a parital circumference of said angled wall wherein said outside wall is configured to insertably receive the output pipe of the food product processing machine having the output pipe of the food product processing machine resting against said upper end of said cylinder;

wherein said outside wall forms a circle which has an inside diameter being greater than an inside diameter of said outer wall of said cylinder;

wherein said cylinder has a gasket recess being recessed into said upper end of said cylinder;

wherein said gasket recess extends around a full circumference of said upper end;

wherein said outside wall has an inwardly facing surface;

wherein said inwardly facing surface has a first section being perpendicularly oriented with said upper end of said cylinder;

wherein said inwardly facing surface has a second section which angles outwardly between said first section and a top end of said outside wall;

wherein said outside wall has a pair of cutouts each extending between said top end of said outside wall and said angled wall;

wherein said pair of cutouts is positioned on opposite sides of said outside wall from each other;

wherein each clamp mount of said pair of clamp mounts includes a first wall having a back edge being coupled to an outer surface of said outer wall of said cylinder;

wherein said first wall is oriented to extend from said angled wall of said upper flange toward a lower end of said cylinder;

wherein said first wall has a front edge being spaced from said outer surface of said outer wall;

wherein said first wall has a bottom edge extending between said front edge and said back edge;

wherein said front edge has a rounded portion which intersects said bottom edge and a first angled portion which angles toward said back edge from said rounded portion;

wherein said front edge has a vertical portion which extends between said first angled portion and a second angled portion of said front edge;

wherein said vertical portion lies on a plane being oriented parallel to said back edge;

wherein said second angled portion angles inwardly between said vertical portion and a lower surface of said angled wall of said upper flange;

wherein said front edge has a notch being recessed into said rounded portion; and wherein said notch in said rounded portion is positioned between said bottom edge and said first angled portion of said front edge.

2. The device according to claim 1, wherein:

said first wall has a first slot extending through a first lateral surface and a second lateral surface of said first wall;

said first slot has a primary section being oriented to angle downwardly between said vertical portion of said front edge of said first wall and said back edge of said first wall;

said first slot has a secondary section extending downwardly from said primary section having said secondary section being oriented parallel to said back edge of said first wall;

said first wall has a first pin hole extending through said first lateral surface of said first wall and said second lateral surface of said first wall; and said first pin hole is spaced from said bottom edge of said first wall such that said rounded portion of said front edge curves around said first pin hole.

3. The device according to claim 1, wherein:

each clamp mount of said pair of clamp mounts includes a second wall having a rear edge being coupled to said outer surface of said outer wall of said cylinder;

said second wall extends between said angled wall of said upper flange toward said lower end of said cylinder;

said second wall is spaced from said first wall;

said second wall has a forward edge being spaced from said outer surface of said outer wall;

said second wall has a lower edge extending between said forward edge and said rear edge;

said forward edge has a rounded portion of said forward edge which intersects said rear edge and a first angled portion of said forward edge which angles toward said rear edge from said rounded portion of said forward edge;

said forward edge has a vertical portion of said forward edge which extends between said first angled portion of said forward edge and a second angled portion of said forward edge;

said vertical portion of said forward edge lies on a plane being oriented parallel to said rear edge;

said second angled portion of said forward edge angles inwardly between said vertical portion of said forward edge and said lower surface of said angled wall of said upper flange;

said forward edge has a notch in said forward edge being recessed into said rounded portion; and said notch in said rounded portion of said forward edge is positioned between said lower edge and said first angled portion of said forward edge.

4. The device according to claim 3, wherein:

said first wall has a first slot extending through a first lateral surface and a second lateral surface of said first wall;

said first wall has a first pin hole extending through said first lateral surface and said second lateral surface of said first wall;

said second wall has a second slot extending through a first lateral surface of said second wall and a second lateral surface of said second wall;

said second slot has a primary section of said second slot being oriented to angle downwardly between said vertical portion of said forward edge and said rear edge of said second wall;

said second slot has a secondary section of said second slot extending downwardly from said primary section of said second slot having said secondary section of said second slot being oriented parallel to said rear edge of said second wall;

said second wall has a second pin hole extending through said first lateral surface of said second wall and said second lateral surface of said second wall; and said second pin hole is spaced from said bottom edge of said second wall having said rounded portion of said forward edge curving around said second pin hole.

5. The device according to claim 3, wherein:

each clamping unit of said pair of clamping units includes an arm having a bottom end and a top end of said arm and a front edge of said arm and a back edge of said arm;

said arm has a first sidelong surface and a second sidelong surface each extending between said bottom end of said arm and said top end of said arm;

said front edge of said arm has a front angled portion angling outwardly between a lower portion and an upper portion of said front edge of said arm;

said back edge of said arm has a back angled portion angling toward said front edge of said arm between a bottom portion and a top portion of said back edge of said arm;

said back angled portion is oriented parallel to said front angled portion;

each of said lower portion of said front edge of said arm and said bottom portion of said back edge of said arm defines a lower section of said arm;

each of said upper portion of said front edge of said arm and said top portion of said back edge of said arm defines an upper section of said arm;

said upper section is offset from said lower section of said arm;

said lower section is associated with said bottom end of said arm;

said upper section is associated with said top end of said arm; and said upper section is spaced a greater distance from said outer wall of said cylinder than a distance between said lower section and said outer wall.

6. The device according to claim 5, wherein:

said front edge of said arm has a plurality of tooth depressions each extending toward said back edge of said arm;

said plurality of tooth depressions is evenly spaced apart from each other and is distributed from said bottom end of said arm toward said front angled portion of said front edge of said arm to define a plurality of teeth on said front edge of said arm; and said arm associated with each of said pair of clamping units is positioned between said first wall and said second wall of a respective one of said pair of clamp mounts;

said arm has a primary pin hole extending through said first sidelong surface and said second sidelong surface;

said primary pin hole is positioned on said lower section of said arm at a point located closer to said front angled portion of said front edge of said arm than said bottom end of said arm;

said arm has a set screw well extending into said lower portion of said front edge of said arm and intersecting said pin hole;

said arm has a secondary pin hole extending through said first sidelong surface and said second sidelong surface;

said secondary pin hole is located on said upper section of said arm;

said secondary pin hole is located closer to said top end of said arm than said back angled portion of said back edge of said arm;

said secondary pin hole is elongated along an axis extending between said top end of said arm and said bottom end of said arm such that said secondary pin hole has an ovoid shape;

said arm has a spring well being located within said arm;

said spring well extends from said secondary pin hole toward said lower section of said arm; and said arm has a screw hole extending into said top end of said arm and intersecting said secondary pin hole.

7. The device according to claim 6, wherein:

said first wall has a first slot extending through a first lateral surface and a second lateral surface of said first wall;

said first slot has a primary section and a secondary section;

said second wall has a second slot extending through a first lateral surface of said second wall and a second lateral surface of said second wall;

said second slot has a primary section of said second slot and a secondary section of said second slot;

each clamping unit of said pair of clamping units includes a first pin extending through said primary pin hole;

said first pin extends through said first slot in said first wall of a respective one of said pair of clamp mounts;

said first pin extends through said second slot in said second wall of said respective clamp mount;

said arm is oriented to travel upwardly along said outer wall of said cylinder when said first pin travels along said secondary section of said first slot and said secondary section of said second slot;

said arm is oriented to angle away from said outer wall of said cylinder when said first pin travels along said primary section of said first slot and said primary section of said second slot;

each clamping unit of said pair of clamping units includes a first set screw extending through said set screw well in said lower portion of said front edge of said arm;

said first set screw threadably engages a bounding surface of said set screw well;

said first set screw compresses against said first pin when said first set screw is tightened in said set screw well for retaining said first pin in said arm; and said first set screw is displaced from said first pin when said first set screw is loosened such that said first pin is removable from said arm.

8. The device according to claim 6, wherein:

each clamping unit of said pair of clamping units includes a lever having a lobed section and a grip section angling away from said lobed section;

said lobed section has an outer edge being continuously arcuate about a center of said lobed section such that said lobed section has a rounded shape;

said grip section has frontmost edge which has a lower section of said frontmost edge extending between said outer edge of said lobed section and an upper section of said frontmost edge angling upwardly from said lower section of said frontmost edge;

said grip section has a rearmost edge being oriented parallel to said upper section of said frontmost edge and intersecting said outer edge of said lobed section;

said rearmost edge has a plurality of depressions being evenly spaced apart from each other;

each of said plurality of depressions has a bounding edge being concavely arcuate with respect to said frontmost edge wherein each depression of said plurality of depressions is configured to conform to the shape of fingers of a user when the user grips said grip section of said lever;

said lever has a pin aperture extending through a first lateral surface of said lever and a second lateral surface of said lever;

said pin aperture is centrally located on said lobed section such that said outer edge of said lobed section curves around said pin aperture;

said lever has a primary pin hole in said lever extending through said first lateral surface of said lever and said second lateral surface of said lever;

said primary pin hole in said lever is located proximate an intersection between said outer edge of said lobed section of said lever and said rearmost edge of said grip section of said lever;

said lever has a secondary pin hole in said lever extending through said first lateral surface of said lever and said second lateral surface of said lever;

said secondary pin hole in said lever is positioned between said primary pin hole in said lever and said lower section of said frontmost edge of said grip section;

said secondary pin hole in said lever is elongated along an axis extending between said pin aperture and said upper section of said frontmost edge of said grip section of said lever such that said secondary pin hole in said lever has an ovoid shape;

said lever has a spring well in said lever extending from said upper section of said frontmost edge of said grip section into said secondary pin hole in said lever;

said outer edge of said lobed section has a plurality of tooth depressions being evenly spaced apart from each other and being distributed along said outer edge to define a plurality of teeth on said outer edge; and said plurality of teeth on said outer edge enmeshes with said plurality of teeth on said front edge of said arm.

9. The device according to claim 8, wherein said first wall has a first slot extending through a first lateral surface and a second lateral surface of said first wall;

said first slot has a primary section and a secondary section;

said second wall has a second slot extending through a first lateral surface of said second wall and a second lateral surface of said second wall;

said second slot has a primary section of said second slot and a secondary section of said second slot;

each clamping unit of said pair of clamping units includes a first pin;

said first pin extends through said first slot in said first wall of a respective one of said pair of clamp mounts;

said first pin extends through said second slot in said second wall of said respective clamp mount;

said arm is lifted upwardly when said lever is pivoted into a first position having said lever angling away from said cylinder such that said first pin travels along said secondary section of said first slot and said secondary section of said second slot;

said arm angles away from said cylinder along an axis extending between said bottom end of said arm and said top end of said arm when said first pin travels along said primary section of said first slot and said primary section of said second slot; and said arm is lowered downwardly when said lever is pivoted into a second position having said lever being pivoted toward said cylinder having said first pin traveling along said primary section of said first slot and said primary section of said second slot and then traveling along said secondary section of said first slot and said secondary section of said second slot such that said arm is oriented parallel to said outer wall of said cylinder.

10. The device according to claim 8, wherein:

said clamp of each clamping unit of said pair of clamping units has a clamping portion which has a concave front edge extending between a top surface and a bottom surface of said clamping portion;

said clamp has a mounting portion extending downwardly from said bottom surface of said clamping portion;

said mounting portion has a bottom end of said mounting portion and a front side;

said mounting portion has a slot extending from said bottom end of said mounting portion toward said bottom surface of said clamping portion;

said clamp has a lip extending downwardly from said bottom surface of said clamping portion;

said lip is aligned with and is co-arcuate with said concave front edge;

said clamping portion has a slot in said clamping portion extending through said top surface and said bottom surface;

said slot in said clamping portion intersecting said slot in said mounting portion; and said top end of said arm is positioned in said slot in said mounting portion such that said clamp is spaced upwardly from said upper flange of said cylinder having said concave front edge being aligned with said first section of said inwardly facing surface of said outside wall of said upper flange and having said mounting portion being aligned with a respective cutout of said pair of cutouts in said outside wall of said upper flange;

said lip is spaced inwardly from said inwardly facing surface of said outside wall of said upper flange and travels downwardly toward said upper end of said cylinder and having said mounting portion extending into said respective cutout in said outside wall of said upper flange when said lever is pivoted toward said cylinder and wherein said concave front edge of said clamping portion is configured to extend around the output pipe thereby centering the output pipe over said cylinder and wherein said lip is configured to compress a flange of the output pipe of the food product processing machine against said upper end of said cylinder; and said lip travels upwardly beyond said upper flange on said cylinder having said concave front edge of said clamping portion being spaced outwardly from said first section of said inwardly facing surface of said outside wall of said upper flange when said lever is pivoted away from said cylinder wherein said clamp is configured to be displaced from the output pipe of the food product processing machine such that said cylinder can be removed from the output pipe.

11. The device according to claim 10, wherein:

each clamping unit of said pair of clamping units includes a clamp pin extending laterally through said mounting portion of said clamp and extending through said second pin hole in said arm such that said mounting portion is pivotally coupled to said arm;

each clamping unit of said pair of clamping units includes a first biasing member being positioned in said spring well in said arm;

said first biasing member abuts said clamp pin such that said first biasing member biases said clamp pin to travel toward said top end of said arm;

each clamping unit of said pair of clamping units includes a first set screw;

each clamping unit of said pair of clamping units includes a second set screw extending through said screw hole in said top end of said arm;

said second set screw compresses against said clamp pin;

said second set screw urges said clamp pin to travel downwardly in said second pin hole when said second set screw is tightened to adjust a height of said clamp with respect to said upper flange of said cylinder;

each clamping unit of said pair of clamping units includes a first set screw and a third set screw extending through said front side of said mounting portion of said clamp;

said third set screw abuts against said upper portion of said front edge of said arm; and said third set screw urges said clamp to travel toward said upper flange of said cylinder when said third set screw is tightened wherein said third set screw is configured to adjust said clamp to accommodate a diameter of the output pipe of the food product processing machine.

12. The device according to claim 8, wherein:

each clamping unit of said pair of clamping units includes a lock comprising a medial member extending between and being perpendicular to a pair of outward members;

each outward member of said pair of outward members has an angled portion angling upwardly from a respective outward member;

each outward member of said pair of outward members has a curved portion curving downwardly and forwardly from a respective outward member;

each outward member of said pair of outward members has a distal portion extending between said angled portion and said curved portion;

said distal portion of a respective outward member intersects said curved portion of said respective outward member at a locking point which protrudes beyond said distal portion;

said distal portion of a respective outward member intersects said angled portion of said respective outward member at a pivot point; and said lever is positioned between said pair of outward members having said medial member being spaced from said frontmost edge of said grip section of said lever wherein said medial member is configured to be manipulated by the user.

13. The device according to claim 12, wherein each clamping unit of said pair of clamping units includes a first lock pin extending through said pivot point associated with each outward member of said pair of outward members of said lock, said first lock pin extending through said primary pin hole in said lever to pivotally attach said lock to said lever;

each clamping unit of said pair of clamping units includes a second lock pin extending through each outward member of said pair of outward members at a point located adjacent to said locking point associated with each outward member of said pair of outward members;

said second lock pin extends through secondary pin hole in said lever;

each clamping unit of said pair of clamping units includes a second biasing member being positioned in said spring well in said lever such that said second biasing member biases said second lock pin to travel in said secondary pin hole in said lever toward said pin aperture in said lever;

each clamping unit of said pair of clamping units includes a thumb screw threadably engaging a bounding surface of said spring well in said lever;

said thumb screw compresses said second biasing member when said thumb screw is tightened to increase a spring force of said second biasing member; and said thumb screw decompresses said second biasing member when said thumb screw is loosened to decrease said spring force of said second biasing member.

14. The device according to claim 12, wherein:

said pair of clamping units includes a first clamping unit and a second clamping unit;

said lever is positionable in a first position or a second position;

said lock associated with said first clamping unit is biased into a locking position having said locking point associated with a respective outward member of said pair of outward members of said lock associated with said first clamping unit being positioned in said notch in said front edge of said first wall of a respective clamp mount and having said locking point associated with a respective outward member of said pair of outward members associated with said first clamping unit being positioned in said notch in said forward edge of said second wall of said respective clamp mount to retain said lever associated with said first clamping unit in said second position; and said lock associated with said first clamping unit is urgeable into an unlocking position having said locking point associated with a respective outward member of said pair of outward members of said lock associated with said first clamping unit being displaced from said notch in said front edge of said first wall of said respective clamp mount and having said locking point associated with said respective outward member of said lock associated with said first clamping unit being displaced from said notch in said forward edge of said second wall of said respective clamp mount such that said lever can be pivoted into said first position.

15. The device according to claim 12, wherein:

said pair of clamping units includes a first clamping unit and a second clamping unit;

said lever is positionable in a first position or a second position;

said lock associated with said second clamping unit is biased into a locking position having said locking point associated with a respective outward member of said pair of outward members of said lock associated with said second clamping unit being positioned in said notch in said front edge of said first wall of a respective clamp mount and having said locking point associated with a respective outward member of said pair of outward members associated with said second clamping unit being positioned in said notch in said forward edge of said second wall of said respective clamp mount to retain said lever associated with said second clamping unit in said second position; and said lock associated with said second clamping unit is urgeable into an unlocking position having said locking point associated with a respective outward member of said pair of outward members of said lock associated with said second clamping unit being displaced from said notch in said front edge of said first wall of said respective clamp mount and having said locking point associated with said respective outward member of said lock associated with said second clamping unit being displaced from said notch in said forward edge of said second wall of said respective clamp mount such that said lever can be pivoted into said first position.

16. A self-centering clamping device being matable to an output pipe of a food product processing machine, said device comprising:

a cylinder having an upper flange wherein said upper flange is configured to be mated to the output pipe of the food product processing machine, said upper flange having an angled wall angling outwardly from an outer wall of said cylinder having said angled wall extending around at least a full partial circumference of said outer wall, said angled wall being aligned with an upper end of said cylinder having said angled wall extending upwardly beyond said upper end, said upper flange having an outside wall extending upwardly from said angled wall having said outside wall extending around a full circumference of said angled wall wherein said outside wall is configured to insertably receive the output pipe of the food product processing machine having the output pipe of the food product processing machine resting against said upper end of said cylinder, said outside wall forming a circle which has an inside diameter being greater than an inside diameter of said outer wall of said cylinder, said cylinder having a gasket recess being recessed into said upper end of said cylinder, said gasket recess extending around a full circumference of said upper end, said outside wall having an inwardly facing surface, said inwardly facing surface having a first section being perpendicularly oriented with said upper end of said cylinder, said inwardly facing surface having a second section which angles outwardly between said first section and a top end of said outside wall, said outside wall having a pair of cutouts each extending between said top end of said outside wall and said angled wall, said pair of cutouts being positioned on opposite sides of said outside wall from each other;

a pair of clamp mounts, each clamp mount of said pair of clamp mounts being coupled to said cylinder, said pair of clamp mounts being positioned on opposite sides of said cylinder from each other, each clamp mount of said pair of clamp mounts comprising:

a first wall having a back edge being coupled to an outer surface of said outer wall of said cylinder, said first wall being oriented to extend from said angled wall of said upper flange toward a lower end of said cylinder, said first wall having a front edge being spaced from said outer surface of said outer wall, said first wall having a bottom edge extending between said front edge and said back edge, said front edge having a rounded portion which intersects said bottom edge and a first angled portion which angles toward said back edge from said rounded portion, said front edge having a vertical portion which extends between said first angled portion and a second angled portion of said front edge, said vertical portion lying on a plane being oriented parallel to said back edge, said second angled portion angling inwardly between said vertical portion and a lower surface of said angled wall of said upper flange, said first wall having a first slot extending through a first lateral surface and a second lateral surface of said first wall, said first slot having a primary section being oriented to angle downwardly between said vertical portion of said front edge of said first wall and said back edge of said first wall, said first slot having a secondary section extending downwardly from said primary section having said secondary section being oriented parallel to said back edge of said first wall, said front edge having a notch being recessed into said rounded portion, said notch in said rounded portion being positioned between said bottom edge and said first angled portion of said front edge, said first wall having a first pin hole extending through said first lateral surface of said first wall and said second lateral surface of said first wall, said first pin hole being spaced from said bottom edge of said first wall such that said rounded portion of said front edge curves around said first pin hole; and a second wall having a rear edge being coupled to said outer surface of said outer wall of said cylinder, said second wall extending between said angled wall of said upper flange toward said lower end of said cylinder, said second wall being spaced from said first wall, said second wall having a forward edge being spaced from said outer surface of said outer wall, said second wall having a lower edge extending between said forward edge and said rear edge, said forward edge having a rounded portion of said forward edge which intersects said rear edge and a first angled portion of said forward edge which angles toward said rear edge from said rounded portion of said forward edge, said forward edge having a vertical portion of said forward edge which extends between said first angled portion of said forward edge and a second angled portion of said forward edge, said vertical portion of said forward edge lying on a plane being oriented parallel to said rear edge, said second angled portion of said forward edge angling inwardly between said vertical portion of said forward edge and said lower surface of said angled wall of said upper flange, said second wall having a second slot extending through a first lateral surface of said second wall and a second lateral surface of said second wall, said second slot having a primary section of said second slot being oriented to angle downwardly between said vertical portion of said forward edge and said rear edge of said second wall, said second slot having a secondary section of said second slot extending downwardly from said primary section of said second slot having said secondary section of said second slot being oriented parallel to said rear edge of said second wall, said forward edge having a notch in said forward edge being recessed into said rounded portion, said notch in said rounded portion of said forward edge being positioned between said lower edge and said first angled portion of said forward edge, said second wall having a second pin hole extending through said first lateral surface of said second wall and said second lateral surface of said second wall, said second pin hole being spaced from said bottom edge of said second wall having said rounded portion of said forward edge curving around said second pin hole;

a pair of clamping units, each clamping unit of said pair of clamping units being pivotally coupled to a respective clamp mount of said pair of clamp mounts wherein each clamping unit of said pair of clamping units is configured to be manipulated by a user, each clamping unit of said pair of clamping units being urgeable into a clamping position having each clamping unit of said pair of clamping units resting upon said upper flange wherein each clamping unit of said pair of clamping units is configured to secure the output pipe of the food product processing machine in said upper flange such that a food product can flow through said cylinder, each clamping unit of said pair of clamping units being urgeable into a releasing position having each clamping unit of said pair of clamping units being spaced upwardly from said upper flange and being laterally spaced from said upper flange wherein said pair of clamping units is configured to release the output pipe of the food product processing machine such that said cylinder can be removed from the output pipe of said food product processing machine, each clamping unit of said pair of clamping units includes a clamp being curved to extend partially around an outlet pipe cylinder of the outlet pipe wherein said clamp is configured to center said cylinder on the output pipe, each clamping unit of said pair of clamping units comprising:

an arm having a bottom end and a top end of said arm and a front edge of said arm and a back edge of said arm, said arm having a first sidelong surface and a second sidelong surface each extending between said bottom end of said arm and said top end of said arm, said front edge of said arm having a front angled portion angling outwardly between a lower portion and an upper portion of said front edge, said back edge of said arm having a back angled portion angling toward said front edge of said arm between a bottom portion and a top portion of said back edge, said back angled portion being oriented parallel to said front angled portion, each of said lower portion of said front edge of said arm and said bottom portion of said back edge of said arm defining a lower section of said arm, each of said upper portion of said front edge of said arm and said top portion of said back edge of said arm defining an upper section of said arm, said upper section being offset from said lower section of said arm, said lower section being associated with said bottom end of said arm, said upper section being associated with said top end of said arm, said upper section being spaced a greater distance from said outer wall of said cylinder than a distance between said lower section and said outer wall, said front edge of said arm having a plurality of tooth depressions each extending toward said back edge of said arm, said plurality of tooth depressions being evenly spaced apart from each other and being distributed from said bottom end of said arm toward said front angled portion of said front edge of said arm to define a plurality of teeth on said front edge of said arm, said arm associated with each of said pair of clamping units being positioned between said first wall and said second wall of a respective one of said pair of clamp mounts, said arm having a primary pin hole extending through said first sidelong surface and said second sidelong surface, said primary pin hole being positioned on said lower section of said arm at a point located closer to said front angled portion of said front edge of said arm than said bottom end of said arm, said arm having a set screw well extending into said lower portion of said front edge of said arm and intersecting said primary pin hole, said arm having a secondary pin hole extending through said first sidelong surface and said second sidelong surface, said secondary pin hole being located on said upper section of said arm, said secondary pin hole being located closer to said top end of said arm than said back angled portion of said back edge of said arm, said secondary pin hole being elongated along an axis extending between said top end of said arm and said bottom end of said arm such that said secondary pin hole has an ovoid shape, said arm having a spring well being located within said arm, said spring well extending from said secondary pin hole toward said lower section of said arm, said arm having a screw hole extending into said top end of said arm and intersecting said secondary pin hole;

a first pin extending through said primary pin hole, said first pin extending through said first slot in said first wall of a respective one of said pair of clamp mounts, said first pin extending through said second slot in said second wall of said respective clamp mount, said arm being oriented to travel upwardly along said outer wall of said cylinder when said first pin travels along said secondary section of said first slot and said secondary section of said second slot, said arm being oriented to angle away from said outer wall of said cylinder when said first pin travels along said primary section of said first slot and said primary section of said second slot;

a first set screw extending through said set screw well in said lower portion of said front edge of said arm, said first set screw threadably engaging a bounding surface of said set screw well, said first set screw compressing against said first pin when said first set screw is tightened in said set screw well for retaining said first pin in said arm, said first set screw being displaced from said first pin when said first set screw is loosened such that said first pin is removable from said arm;

a lever having a lobed section and a grip section angling away from said lobed section, said lobed section having an outer edge being continuously arcuate about a center of said lobed section such that said lobed section has a rounded shape, said grip section having frontmost edge which has a lower section of said frontmost edge extending between said outer edge of said lobed section and an upper section of said frontmost edge angling upwardly from said lower section of said frontmost edge, said grip section having a rearmost edge being oriented parallel to said upper section of said frontmost edge and intersecting said outer edge of said lobed section, said rearmost edge having a plurality of depressions being evenly spaced apart from each other, each of said plurality of depressions having a bounding edge being concavely arcuate with respect to said frontmost edge wherein each depression of said plurality of depressions is configured to conform to the shape of fingers of the user when the user grips said grip section of said lever, said lever having a pin aperture extending through a first lateral surface of said lever and a second lateral surface of said lever, said pin aperture being centrally located on said lobed section such that said outer edge of said lobed section curves around said pin aperture, said lever having a primary pin hole in said lever extending through said first lateral surface of said lever and said second lateral surface of said lever, said primary pin hole in said lever being located proximate an intersection between said outer edge of said lobed section of said lever and said rearmost edge of said grip section of said lever, said lever having a secondary pin hole in said lever extending through said first lateral surface of said lever and said second lateral surface of said lever, said secondary pin hole in said lever being positioned between said primary pin hole in said lever and said lower section of said frontmost edge of said grip section, said secondary pin hole in said lever being elongated along an axis extending between said pin aperture and said upper section of said frontmost edge of said grip section of said lever such that said secondary pin hole in said lever has an ovoid shape, said lever having a spring well in said lever extending from said upper section of said frontmost edge of said grip section into said secondary pin hole in said lever, said outer edge of said lobed section having a plurality of tooth depressions being evenly spaced apart from each other and being distributed along said outer edge to define a plurality of teeth on said outer edge, said plurality of teeth on said outer edge enmeshing with said plurality of teeth on said front edge of said arm, said arm being lifted upwardly when said lever is pivoted into a first position having said lever angling away from said cylinder such that said first pin travels along said secondary section of said first slot and said secondary section of said second slot, said arm angling away from said cylinder along an axis extending between said bottom end of said arm and said top end of said arm when said first pin travels along said primary section of said first slot and said primary section of said second slot, said arm being lowered downwardly when said lever is pivoted into a second position having said lever being pivoted toward said cylinder having said first pin traveling along said primary section of said first slot and said primary section of said second slot and then traveling along said secondary section of said first slot and said secondary section of said second slot such that said arm is oriented parallel to said outer wall of said cylinder;

said clamp having a clamping portion which has a concave front edge extending between a top surface and a bottom surface of said clamping portion, said clamp having a mounting portion extending downwardly from said bottom surface of said clamping portion, said mounting portion having a bottom end of said mounting portion and a front side, said mounting portion having a slot extending from said bottom end of said mounting portion toward said bottom surface of said clamping portion, said clamp having a lip extending downwardly from said bottom surface of said clamping portion, said lip being aligned with and being co-arcuate with said concave front edge, said clamping portion having a slot in said clamping portion extending through said top surface and said bottom surface, said slot in said clamping portion intersecting said slot in said mounting portion, said top end of said arm being positioned in said slot in said mounting portion such that said clamp is spaced upwardly from said upper flange of said cylinder having said concave front edge being aligned with said first section of said inwardly facing surface of said outside wall of said upper flange and having said mounting portion being aligned with a respective cutout of said pair of cutouts in said outside wall of said upper flange, said lip being spaced inwardly from said inwardly facing surface of said outside wall of said upper flange and traveling downwardly toward said upper end of said cylinder and having said mounting portion extending into said respective cutout in said outside wall of said upper flange when said lever is pivoted toward said cylinder wherein said concave front edge of said clamping portion is configured to extend around the output pipe thereby centering the output pipe over said cylinder and wherein said lip is configured to compress a flange of the output pipe of the food product processing machine against said upper end of said cylinder, said lip traveling upwardly beyond said upper flange on said cylinder having said concave front edge of said clamping portion being spaced outwardly from said first section of said inwardly facing surface of said outside wall of said upper flange when said lever is pivoted away from said cylinder wherein said clamp is configured to be displaced from the output pipe of the food product processing machine such that said cylinder can be removed from the output pipe;

a clamp pin extending laterally through said mounting portion of said clamp and extending through said secondary pin hole in said arm such that said mounting portion is pivotally coupled to said arm;

a first biasing member being positioned in said spring well in said arm, said first biasing member abutting said clamp pin such that said first biasing member biases said clamp pin to travel toward said top end of said arm;

a second set screw extending through said screw hole in said top end of said arm, said second set screw compressing against said clamp pin, said second set screw urging said clamp pin to travel downwardly in said secondary pin hole when said second set screw is tightened to adjust a height of said clamp with respect to said upper flange of said cylinder;

a third set screw extending through said front side of said mounting portion of said clamp, said third set screw abutting against said upper portion of said front edge of said arm, said third set screw urging said clamp to travel toward said upper flange of said cylinder when said third set screw is tightened wherein said third set screw is configured to adjust said clamp to accommodate a diameter of the output pipe of the food product processing machine;

a lock comprising a medial member extending between and being perpendicular to a pair of outward members, each outward member of said pair of outward members having an angled portion angling upwardly from a respective outward member, each outward member of said pair of outward members having a curved portion curving downwardly and forwardly from a respective outward member, each outward member of said pair of outward members having a distal portion extending between said angled portion and said curved portion, said distal portion of a respective outward member intersecting said curved portion of said respective outward member at a locking point which protrudes beyond said distal portion, said distal portion of a respective outward member intersecting said angled portion of said respective outward member at a pivot point, said lever being positioned between said pair of outward members having said medial member being spaced from said frontmost edge of said grip section of said lever wherein said medial member is configured to be manipulated by the user;

a first lock pin extending through said pivot point associated with each outward member of said pair of outward members of said lock, said first lock pin extending through said primary pin hole in said lever to pivotally attach said lock to said lever;

a second lock pin extending through each outward member of said pair of outward members at a point located adjacent to said locking point associated with each outward member of said pair of outward members, said second lock pin extending through secondary pin hole in said lever;

a second biasing member being positioned in said spring well in said lever such that said second biasing member biases said second lock pin to travel in said secondary pin hole in said lever toward said pin aperture in said lever; and a thumb screw threadably engaging a bounding surface of said spring well in said lever, said thumb screw compressing said second biasing member when said thumb screw is tightened to increase a spring force of said second biasing member, said thumb screw decompressing said second biasing member when said thumb screw is loosened to decrease said spring force of said second biasing member;

wherein said pair of clamping units includes a first clamping unit and a second clamping unit;

said lock associated with said first clamping unit being biased into a locking position having said locking point associated with a respective outward member of said pair of outward members of said lock associated with said first clamping unit being positioned in said notch in said front edge of said first wall of a respective clamp mount and having said locking point associated with a respective outward member of said pair of outward members associated with said first clamping unit being positioned in said notch in said forward edge of said second wall of said respective clamp mount to retain said lever associated with said first clamping unit in said second position, said lock associated with said first clamping unit being urgeable into an unlocking position having said locking point associated with a respective outward member of said pair of outward members of said lock associated with said first clamping unit being displaced from said notch in said front edge of said first wall of said respective clamp mount and having said locking point associated with said respective outward member of said lock associated with said first clamping unit being displaced from said notch in said forward edge of said second wall of said respective clamp mount such that said lever can be pivoted into said first position; and said lock associated with said second clamping unit being biased into a locking position having said locking point associated with a respective outward member of said pair of outward members of said lock associated with said second clamping unit being positioned in said notch in said front edge of said first wall of a respective clamp mount and having said locking point associated with a respective outward member of said pair of outward members associated with said second clamping unit being positioned in said notch in said forward edge of said second wall of said respective clamp mount to retain said lever associated with said second clamping unit in said second position, said lock associated with said second clamping unit being urgeable into an unlocking position having said locking point associated with a respective outward member of said pair of outward members of said lock associated with said second clamping unit being displaced from said notch in said front edge of said first wall of said respective clamp mount and having said locking point associated with said respective outward member of said lock associated with said second clamping unit being displaced from said notch in said forward edge of said second wall of said respective clamp mount such that said lever can be pivoted into said first position.

* * * * *